United States Patent [19]
Tsuga et al.

[11] Patent Number: 5,691,972
[45] Date of Patent: Nov. 25, 1997

[54] MULTIMEDIA OPTICAL DISC WHICH CONFORMS TO THE MOTION PICTURE RATING SYSTEMS IN A VARIETY OF COUNTRIES AND A REPRODUCING DEVICE FOR SAID DISC

[75] Inventors: Kazuhiro Tsuga, Takarazuka; Masayuki Kozuka, Neyagawa; Yoshihisa Fukushima, Osaka; Hideki Mimura; Takeshi Hagio, both of Yokohama, all of Japan

[73] Assignees: Matsushita Electric Industrial Co., Ltd., Osaka; Kabushiki Kaisha Toshiba, Kanagawa-ken, both of Japan

[21] Appl. No.: 727,710

[22] Filed: Oct. 7, 1996

[30] Foreign Application Priority Data

Oct. 9, 1995 [JP] Japan ................... 7-261750

[51] Int. Cl.⁶ ........................... G11B 7/00
[52] U.S. Cl. ................ 369/275.3; 369/32; 369/58
[58] Field of Search ............. 369/275.1–275.2, 369/32, 97, 54, 58

[56] References Cited

U.S. PATENT DOCUMENTS 5,617,386  4/1997  Choi ................................. 369/32
5,617,407  4/1997  Bareis .............................. 369/32

*Primary Examiner*—Nabil Hindi
*Attorney, Agent, or Firm*—Price, Gess & Ubell

[57] ABSTRACT

A multimedia disc made up of a video data storage region for storing a plurality of video data sequences, a management information storage region which stores management information, the management information comprising group information that shows which video data sequences have been grouped together to compose a group from reproduced, a level ID for each video data sequence in a which only one of the composing video data sequences is same group and a set of link information for each video data sequence which indicates a next video data sequence to be reproduced after completion of reproduction of a video data sequence in question, and a level map storage region for storing a separate table for each country/region, wherein each table for a country/region includes information which maps each sort level in a sorting system for the country/region to a level ID.

37 Claims, 26 Drawing Sheets

Fig. 7

| PROGRAM CHAIN ATTRIBUTES | BLOCK TYPE | BLOCK MODE | LEVEL ID |
|---|---|---|---|
| #1 | NO PARENTAL BLOCK | NULL | NULL OR 8 |
| #2 | PARENTAL BLOCK | START | 2("18") |
| #3 | PARENTAL BLOCK | MIDDLE | 5("15") |
| #4 | PARENTAL BLOCK | END | 8("GENERAL") |
| #5 | PARENTAL BLOCK | START | 5("15") |
| #6 | PARENTAL BLOCK | END | 8("GENERAL") |
| #7 | NO PARENTAL BLOCK | NULL | NULL OR 8 |

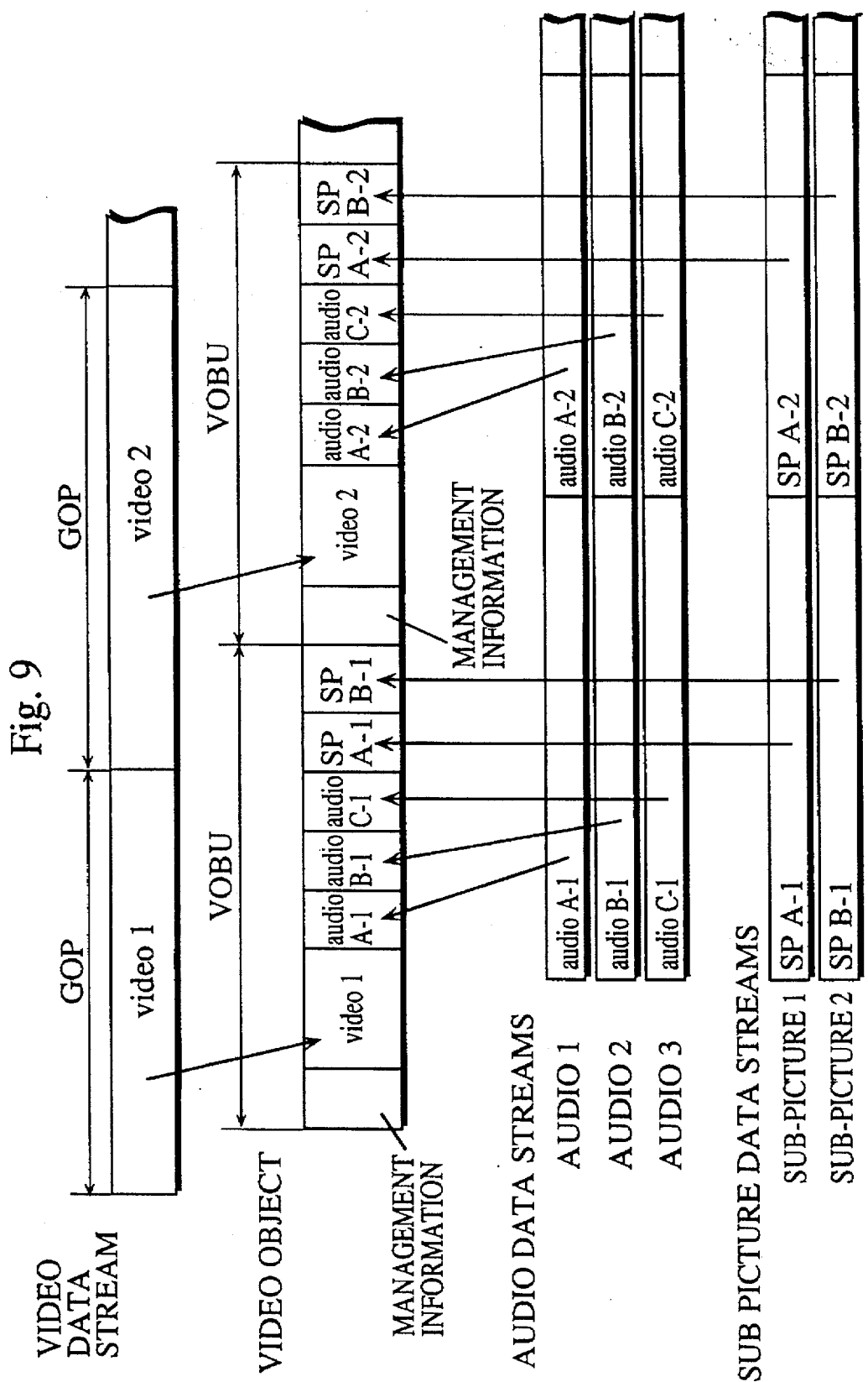

CONTENT OF NONVOLATILE MEMORY

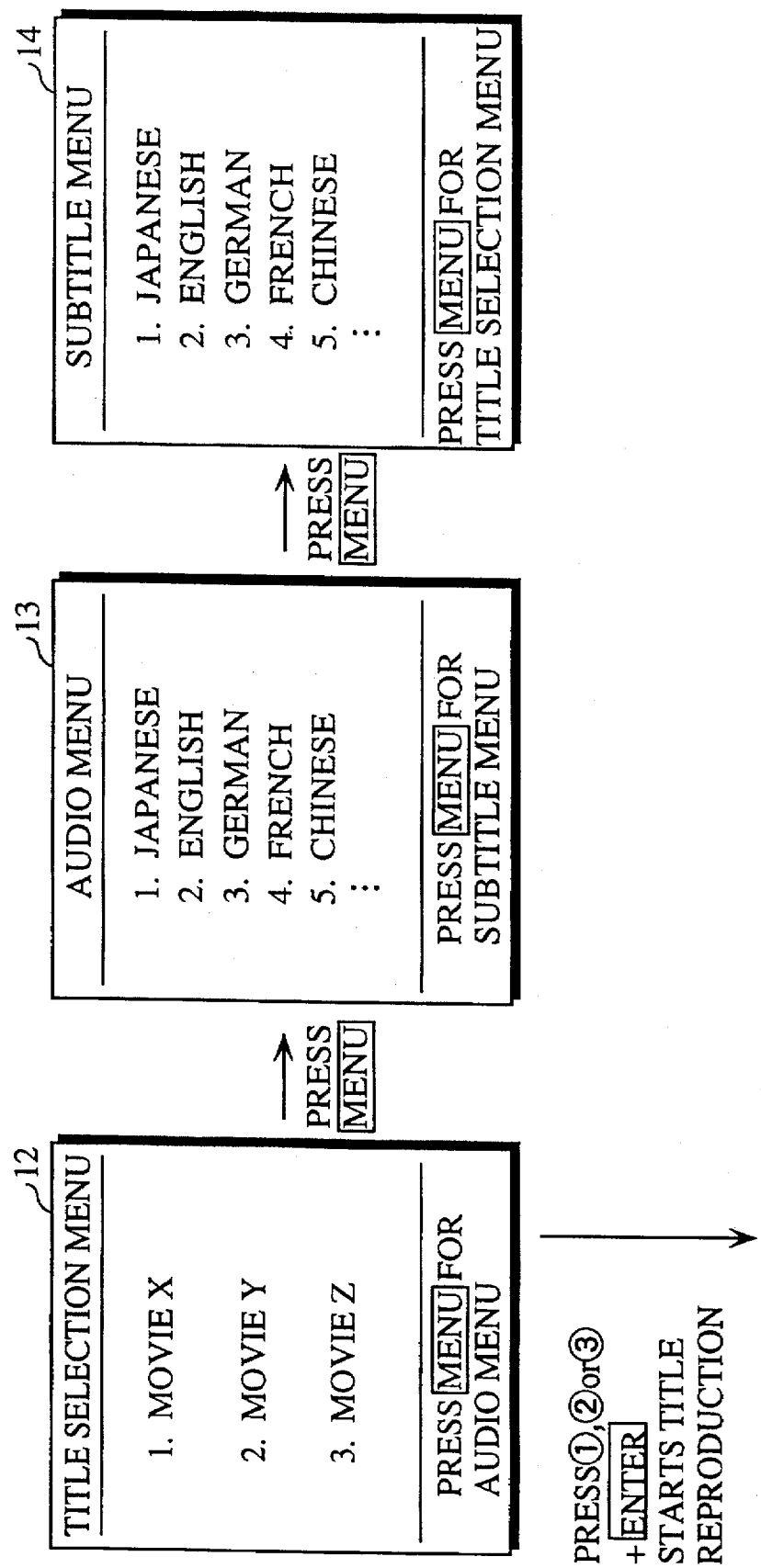

MULTIMEDIA OPTICAL DISC WHICH CONFORMS TO THE MOTION PICTURE RATING SYSTEMS IN A VARIETY OF COUNTRIES AND A REPRODUCING DEVICE FOR SAID DISC

BACKGROUND OF THE INVENTION

1. Field of the Invention

The present invention relates to a multimedia optical disc which stores multimedia data including digital video data, audio data and sub-picture data as well as to a reproducing device for the disc. More specifically, the invention is a technique related to the different motion picture ratings systems in use in a variety of countries.

2. Description of the Related Art

In recent years there has been a spread in the use of optical discs, such as laser discs and video CDs, as optical storage media for recording multimedia data made up of video, audio and other such data.

Of these, video CDs have achieved a storage capacity of around 600 MB (megabytes) for a medium which was originally used for digital audio, with the storage of video data having been achieved due to the development of a high-compression video data compression method called MPEG (Moving Pictures Experts Group). In this way, movie titles which were stored on laser discs can now be stored on video CDs.

As the result of recent research and development, DVDs (digital video discs) which achieve a dramatic increase in storage capacity have been developed. Such DVDs have a storage capacity of around 4.7 GB (gigabytes), so that video whose image quality is vastly superior to video CDs (whereby an increased amount of data is used per unit reproduction time) can be stored and the maximum reproduction time can be increased to allow the recording of long titles. More precisely, the reproduction time of seventy-four minutes which is possible with a video CD can be increased to over two hours for a DVD. For these reasons, DVDs allow the storage of movies which, due to their long reproduction time, cannot be recorded on video CDs, with the long reproduction time and high picture quality making DVDs ideal for such storage.

Regarding movie titles, it is common for several different versions (or ratings) of a same movie to exist, such versions differing from each other in content. As examples, there can be an adult version and a general viewing version, a cut version and a no-cut version, or a cinema version and a television broadcast version.

The following is an explanation of a first conventional reproduction system for reproducing a specified version out of a plurality of different versions of a same movie which are efficiently stored on an optical disc.

This reproduction system includes a registering unit, a selecting unit and a reading unit and is a system which selects and reproduces one out of two or more versions of a same film stored on a software carrier.

The software carrier referred to here has the video data blocks of the following three types stored on a same track. 1. Blocks including video data unique to one of the two or more versions. 2. Blocks including video data unique to another of the two or more versions. 3. Blocks including video data which is common to two or more versions.

For this kind of reproduction system, the registering unit registers which of the versions is to be reproduced. The selecting unit selects the common blocks and only the blocks which are unique to the selected version. The reading unit reads the video data for the selected blocks from the software carrier and generates a reproduction signal, with the video data in the same track which is unique to a version which is not being played being excluded.

FIG. 1 shows the aspects of reproduction of a plurality of video data blocks by such a conventional reproduction system. In this drawing, optional block A is video data unique to version A (such as an adult version), optional block B is video data unique to version B (such as a general viewing version) and common blocks 1 and 2 are video data which is common to both versions.

In the present example, the blocks described above are recorded on a software carrier and "version B" is registered in the registering unit of the reproduction system. In this case, common block 1, optional block B and common block 2 are selected in that order by the selecting unit and the video data in common block 1, optional block B and common block 2 is read by the reading unit.

By means of this kind of conventional system, for an example when an adult and a general viewing version of a same movie title are recorded on a software carrier, the continuous reproduction of only the general viewing version or only the adult version can be achieved. By doing so, a parental lock can be achieved whereby parents can ensure that the reproduction of a general viewing version, which does not include scenes featuring sex or violence that are unsuitable for minors, is performed.

However, it has not been possible under this conventional technique for media (such as DVDs) which are aimed at a specific country (or region) to be used in a different country (or region). This is because the differences between the versions on a disc are based on a rating system in accordance with the self-regulation of the film industry in a given country, which differs from country to country.

The following is a more specific explanation of the rating systems used in different countries.

In Japan, self-regulation by the film industry is performed using the three levels "General Viewing", "R" and "Adult" which are based on the content of a film. Here, "General Viewing" is for films with no age restrictions, "R" is for films which should not be shown to children of junior high school age or younger and "Adult" is for films which should not be shown to under eighteens.

In the USA, self-regulation by the Motion Picture Association of America (MPAA) is performed using the six levels "G", "PG", "PG-13", "R", "NC-17" and "X". Here, these represent a very fine classification in which "G" denotes films for general viewing, "PG" denotes films for which parental guidance is recommended, "PG-13" denotes films which should not be shown to under-thirteens, "R" denotes films which should not be shown to under seventeens without their guardian's approval, "NC-17" denotes films which are not to be shown to under seventeens and "X" denotes films for adults.

In the same way, five ratings levels are used in Germany, three are used in Italy and four are used in Australia, so that rating systems differ between country or even between regions of a same country. Because of these differences in rating systems, it has not been possible for a conventional disc on which three versions of a film for, say, the Japanese rating system are recorded to be validly used in another country with a different rating system.

If it is supposed the aforementioned ratings problem does not occur, there is still the problem of the different languages used in different countries. If, for example, different language versions of a film are to be recorded on a disc separately to the plurality of versions for different ratings, while this may be possible for a short film, in can in no way be realized for a two-hour film.

There is the further problem of the reproduction device to be used for such a disc. Here, while it is necessary for a reproduction device to select an appropriate version in accordance with the ratings system in force in the country of use, it has not been possible for such a device to reproduce appropriate sections of another country's version.

From the standpoint of a supplier of movie titles (which is to say, a disc manufacturer), it is necessary to create, distribute and manage separate discs not only for different ratings systems but also for different languages which causes considerable trouble. Since the manufacturing costs increase as the number of languages and country-based ratings systems increase, manufacturers have had to focus on countries where they can expect high sales. As a result, users in countries which use minor languages or ratings systems have not been able to enjoy a great variety of movie software.

In view of this situation, it has been the dream of movie title suppliers to be able to provide a full-length movie complete with versions for different language and for different ratings systems on a same disc which can be used worldwide.

SUMMARY OF THE INVENTION

It is a primary object of the present invention to provide a disc which can be used to supply movie software to every country in the world and which can achieve reproduction control in accordance with the ratings system in force in the country of use, as well as to a reproduction device for the disc.

The above object can be achieved by a multimedia disc, comprising: a video data storage region for storing a plurality of video data sequences; a management information storage region which stores management information, the management information comprising group information that shows which video data sequences have been grouped together to compose a group from which only one of the composing video data sequences is reproduced, a level ID for each video data sequence in a same group and a set of link information for each video data sequence which indicates a next video data sequence to be reproduced after completion of reproduction of a video data sequence in question; and a level map storage region for storing a separate table for each country/region, where each table for a country/region includes information which maps each sort level in a sorting system for the country/region to a level ID.

Also, the table for a country/region may store a country/region code for identifying the country/region, sort levels in the sorting system in the corresponding country/region and a level ID which corresponds to each sort level, and a sorting system in a country/region may be made up a plurality of sort levels which show viewing regulations which correspond to an extent to which violent scenes and sex scenes are included in video data and each sort level is expressed by a character string which expresses an appropriate name within the sorting system in question.

By means of the stated construction, different video data for adult and general viewing versions can be grouped together and distinguished from each other using level IDs. These level IDs are correctly related to every level in the sorting (rating) systems in force in every country or region, so that video data corresponding to the desired level can be reproduced. Also, while the separate setting of these rating systems in each country or region means that there are disparities between countries/regions regarding the number of sorting levels used and their actual restrictions, each of these sorting levels can be expressed using a character string so that a reproduction system with sufficient flexibility for a variety of rating systems can be achieved.

Also, by recording a plurality of titles with different sort levels on one disc, a reduction can be made in the cost to the software supplier of producing and managing optical discs, in addition to allowing such suppliers to market the same disc worldwide.

Here, when coupled with control of a reproduction device which reproduces titles at the users' specified sort level, a parental lock can be achieved.

Here, each video data sequence may include at least one of a plurality of sets of audio data and a plurality of sets of sub-picture data which are interleaved with a corresponding video segment of a given reproduction period, so that a content of each set of audio data may correspond to the video segment of the given reproduction period and a content of each set of sub-picture data may correspond to the video segment of the given reproduction period.

By means of the stated construction, each video segment in a video data sequence is stored efficiently with a plurality of sets of audio data and/or a plurality of sets of sub-picture data (subtitles), so that during reproduction, a user can select his/her desired audio and/or subtitles.

Here, each video segment may be made up of images in a movie title and the plurality of sets of audio data may be composed of soundtracks dubbed in different languages.

Here, each video segment may be made up of images in a movie title and the plurality of sets of sub-picture data are composed of subtitles in different languages.

By means of the stated construction, each video segment can be efficiently recorded on the disc with a variety of accompanying sets of audio in different languages and/or subtitles in different languages.

Here, the multimedia optical disc may further include a track which has the sectors arranged in a spiral and the management information storage region and the level map storage region may be assigned to track positions which are read before the video data storage region by a reproduction device.

By means of the stated construction, it is possible to minimize any inefficiencies (such as the time taken by head seek operations) in the retrieval of video data following the retrieval from the management information storage region and the level map storage region.

Here, each video data sequence may made up of a plurality of objects, and chains, each which indicates a combination of objects which forms one of the video data sequences, may be stored in the management information storage region.

Here, the video data storage region may be made up of a plurality of object storage regions, each of the object storage regions being recorded in consecutive sectors of the multimedia disc.

Here, each of the objects may be made up of a plurality of object units, with each of the object units being made up of one video segment and a plurality of sets of audio data, and the plurality of object units may be arranged in order of reproduction in the object storage regions.

By means of the stated construction, since the video data sequences for different level IDs may use the same objects at least in part, the video data for different versions can be efficiently stored on a disc.

The aforementioned primary object may also be achieved by a multimedia optical disc which comprises: a video data storage region for storing one video data sequence; a management information storage region which stores management information, the management information comprising a level ID for the video data sequence; and a level map storage region for storing a separate table for each country/region, with each table for a country/region including information which maps each sort level in a sorting system for the country/region to the level ID.

The aforementioned object can be achieved by a reproduction device for a multimedia optical disc which includes: a video data storage region for storing a plurality of video data sequences; a management information storage region which stores management information, the management information comprising group information that shows which video data sequences have been grouped together to compose a group from which only one of the composing video data sequences is reproduced, a level ID for each video data sequence in a same group and a set of link information for each video data sequence which indicates a next video data sequence to be reproduced after completion of reproduction of a video data sequence in question; and a level map storage region for storing a separate table for each country/region, with each table for a country/region including information which maps each sort level in a sorting system for the country/region to a level ID, the reproduction device comprising: a region code storage unit for storing a region code showing a country/region; a level registration unit for registering one of the sort levels for the sorting system used in the region indicated by the region code, in accordance with a user indication; a reading unit for reading management information, mapping information and video data sequences from the optical disc; a table specification unit for specifying a table for the country/region corresponding to the region code stored by the region code storage unit; a reproduction level setting unit for setting a level ID which corresponds to the sort level registered in the level registration unit as a reproduction level by referring to the specified table of the country/region; a reading control unit for determining a video data sequence corresponding to the set reproduction level in accordance with the group information and controlling the reading unit to read the determined video data sequence; and a reproduction unit for reproducing every video data sequence read by the reading unit.

By means of the stated construction, the reproduction level is set by the reproduction level setting unit in accordance with the region code stored by the region code storage unit and the sort level registered in the level registration unit. The video data is then retrieved at the set reproduction level by the retrieval control unit and the reproduction unit. Accordingly, video data can be reproduced in accordance with the sort level registered in the level registration unit by a user indication, for any sort level in any rating system operational in a country or region.

Here, when a next video data sequence to be reproduced is part of a group, a present set of link information may indicate any video data sequence in the same group, and the reading control unit may include: a provisional setting unit for provisionally setting a video data sequence indicated by the link information of a video data sequence presently being reproduced as a next video data sequence to be reproduced; an actual setting unit for referring to the group information, for determining whether there is any other video data sequence which is grouped with the provisionally set video data sequence to allow selective reproduction, for actually setting the provisionally set video data sequence if no other video data sequence has been determined and for actually setting a video data sequence of the same group which corresponds to the reproduction level set by the reproduction level setting unit if another video data sequence has been determined; and an indication instruction unit for indicating to the reading control unit to have the actually set video data sequence reproduced.

Here, the actual setting unit may include: a comparison unit for comparing the reproduction level set by the reproduction level setting unit with a level ID of each video data sequence which belongs to a same group as the provisionally set video data sequence; a first determining unit for actually setting, when the comparison unit finds that there is a video data sequence with a level ID which corresponds to the reproduction level, the video data sequence with the corresponding level ID; and a second determining unit for actually setting, when the comparison unit finds that there is no video data sequence with a level ID which corresponds to the reproduction level, a video data sequence with a level ID which is close to the reproduction level but which represents a less restricted video content.

By means of the stated construction, the video data to be reproduced out of a group is set by the provisional setting unit and the actual setting unit, so that it is unnecessary for the link information to separately indicate each of the video data sequences in a group and instead may only indicate any of the video data sequences in the group. This makes the link information extremely simple, with the reproduction device being able to link and reproduce video data sequences which have been grouped and sequences which have not been group converted at the required reproduction level. The reproduction device is also able to reproduce video data sequences at the reproduction level set by the reproduction level setting unit or at a less restricted level ID.

Here, the reproduction device may further comprise: an indication unit for indicating a set of audio data according to a user operation; a video reproduction unit for reproducing a video segment in a video data sequence; an audio selection unit for selecting the indicated set of audio data from the plurality of sets of audio data which are to be reproduced with the video segment; and an audio reproduction unit for reproducing the selected set of audio data.

Also, a plurality of sets of sub-picture data which are to be reproduced together with video may be interleaved in each video data sequence, the indication unit may also indicate a set of sub-picture data and the reproduction device may further include: a sub-picture selection unit for selecting one set of sub-picture data which corresponds to an indicated language out of a plurality of sets of sub-picture data to be reproduced with a video segment; and a sub-picture reproduction unit for reproducing the selected set of sub-picture data.

By means of the stated construction, the user's desired audio data and sub-picture data are selected using the audio selection unit and the sub-picture selection unit and reproduced by the audio reproduction unit and the sub-picture reproduction unit. As one example, when the sets of audio data are soundtracks in different languages and the sets of sub-picture data are subtitles in different languages, the user may have his/her desired soundtrack and subtitles reproduced.

Here, the level registration unit may register a sort level and a personal identification number and the reproduction device may further include: an input unit for inputting a personal identification number in accordance with a user operation; a coincidence judgement unit for judging whether the inputted personal identification number coincides with the personal identification number registered in the level registration unit; and a change permission determination unit for determining that the registered sort level can be changed by the user when the coincidence judgement unit judges that there is coincidence.

By means of the stated construction, only specified users who know the personal identification number are allowed to change the sort level.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 7 shows a more detailed example of the attribute table shown in FIG. 5;

FIG. 9 shows how the composite data stream called a VOB is made up of compressed video data and compressed audio data;

FIG. 20 shows a example display of the volume menu; and

DESCRIPTION OF THE PREFERRED EMBODIMENT

The present embodiment describes an example where a DVD (digital video disc) which can achieve a storage capacity of around 4.7 GB on one side of a 120 mm diameter optical disc is used as a multimedia optical disc.

Physical Construction of the Optical Disc

Figure 1:
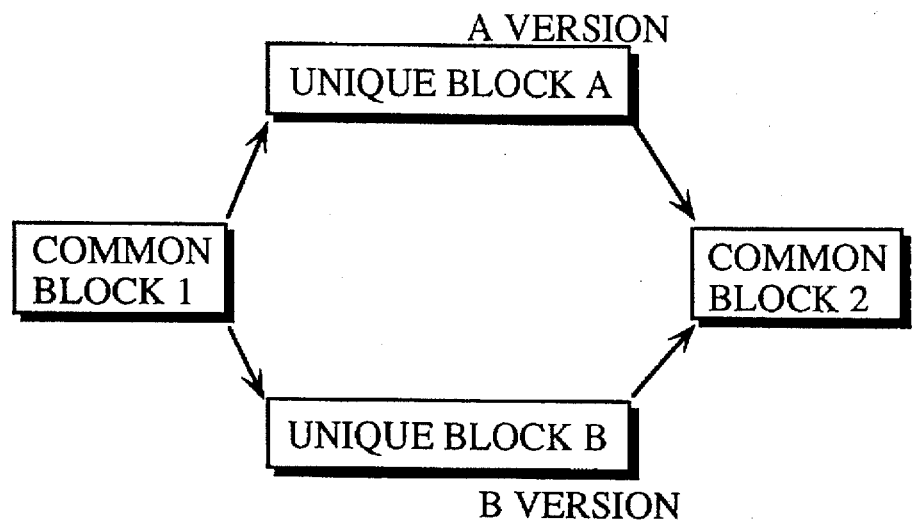
FIG. 1 shows reproduction routes for video data blocks in a plurality of versions for a conventional reproduction system.
Figure 2:
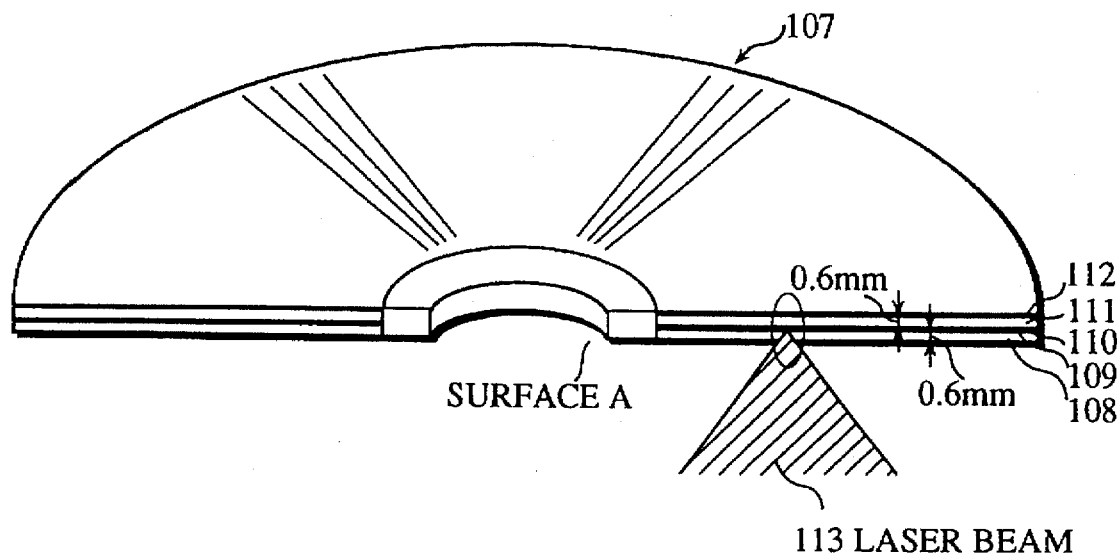
FIG. 2 shows a cross-section of a DVD as used in the embodiment of the present invention.
Figure 3:
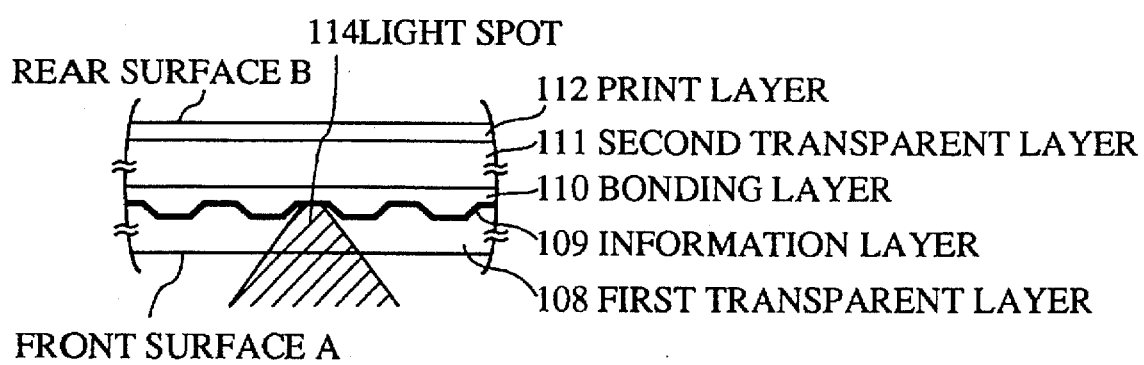
FIG. 3 shows an enlargement of the cross-section of the DVD shown in FIG. 2.

FIG. 2 shows a cross-section of the DVD. Starting from the bottom, DVD 107 is formed of a first transparent substrate 108 which is around 0.6 mm thick (which is to say between 0.5 mm and 0.7 mm), on top of which an information layer 109 made of a reflective membrane such as metal foil is attached, with a bonding layer 110 and then a second transparent substrate 111 being formed on top of the information layer 109. If necessary, a print layer 112, or in other words a printed label, is printed on top of the second transparent substrate 111, with it not being necessary for this print layer 112 to cover the entire disc.

In this drawing, the bottom side of the disc onto which laser beam 113 is shone and from which information is read is set as the read-out surface A, while the top side of the disc with the print layer 112 is set as the rear surface B. Here, indented and protruding pits are formed in the information layer 109 side of the first transparent substrate 108 by a manufacturing process so that information can be recorded by varying the length of pits and the intervals between them. This is to say, the indentations and protrusions of the pits in the first transparent surface 108 are imprinted into the information layer 109. The lengths of the pits and intervals for this disc are shorter than on a conventional CD, with the pitch of the information tracks in which the pit streams are formed also being narrower, which results in improved surface storage density.

The surface A side of the first transparent substrate 108 in which pits are not formed is flat. The second transparent substrate 111 is a reinforcer and is made of the same thickness (around 0.6 mm) of the same material as the first transparent substrate 108, with both of its surfaces being flat.

Information is retrieved from this kind of disc by shining the laser beam 113 on the disc and measuring changes in the reflection ratio of the light spot 114. The light spot 114 on a DVD has a diameter of around 1/1.6 times the diameter of a light spot on a conventional CD due to an increase in the numerical aperture NA of the objective lens and a reduction in the wavelength λ of the laser beam, DVDs of the physical construction described above can store around 4,7 GB of information on one side, which is almost eight times the storage capacity of a conventional CD. As a result, it is possible to achieve a great improvement in picture quality for moving pictures and to increase the reproduction time from the 74 minutes which is possible with a video CD to over two hours. This high storage capacity makes DVDs very suitable for use as storage media for moving pictures.

The substrate technique which has enabled this improvement in storage capacity is a reduction of the spot diameter D of the laser beam. Here, spot diameter D is given by the equation "D=laser wavelength $\lambda$/numerical aperture of objective lens NA", so that the spot diameter D can be reduced by reducing the laser wavelength $\lambda$ and by increasing the numerical aperture of objective lens NA. It should be noted here that if the numerical aperture of objective lens NA is increased, comatic aberration occurs due to the relative inclination, known as "tilt", between the optical axis of the beam and the disc surface. In order to suppress this phenomenon, DVDs use a transparent substrate of reduced thickness. Such a reduction in the thickness of the transparent substrate creates the problem of reduced physical durability for the disc, although this problem can be overcome by reinforcing DVDs with another substrate. Here, it is especially desirable to have the two substrates formed of the same thickness of the same material.

Data is read from DVDs using an optical system with a short wavelength (650 nm) red semiconductor laser and an objective lens whose NA (numerical aperture) can be enlarged up to 0.6 mm. If the thickness of the transparent substrate is reduced to around 0.6 mm, a storage capacity of up to 4.7 GB can be achieved for one side of a 120 mm diameter optical disc. With this large storage capacity, there is more than enough capacity for a whole feature film to be recorded on one disc, with it further being possible for the manufacturer to include soundtracks in several different languages. In fact, the storage capacity of 4.7 GB achieved by this substrate technique allows the storage of several sets of video and audio data on a same disc.

Data Composition of the Entire Disc

Figure 4:
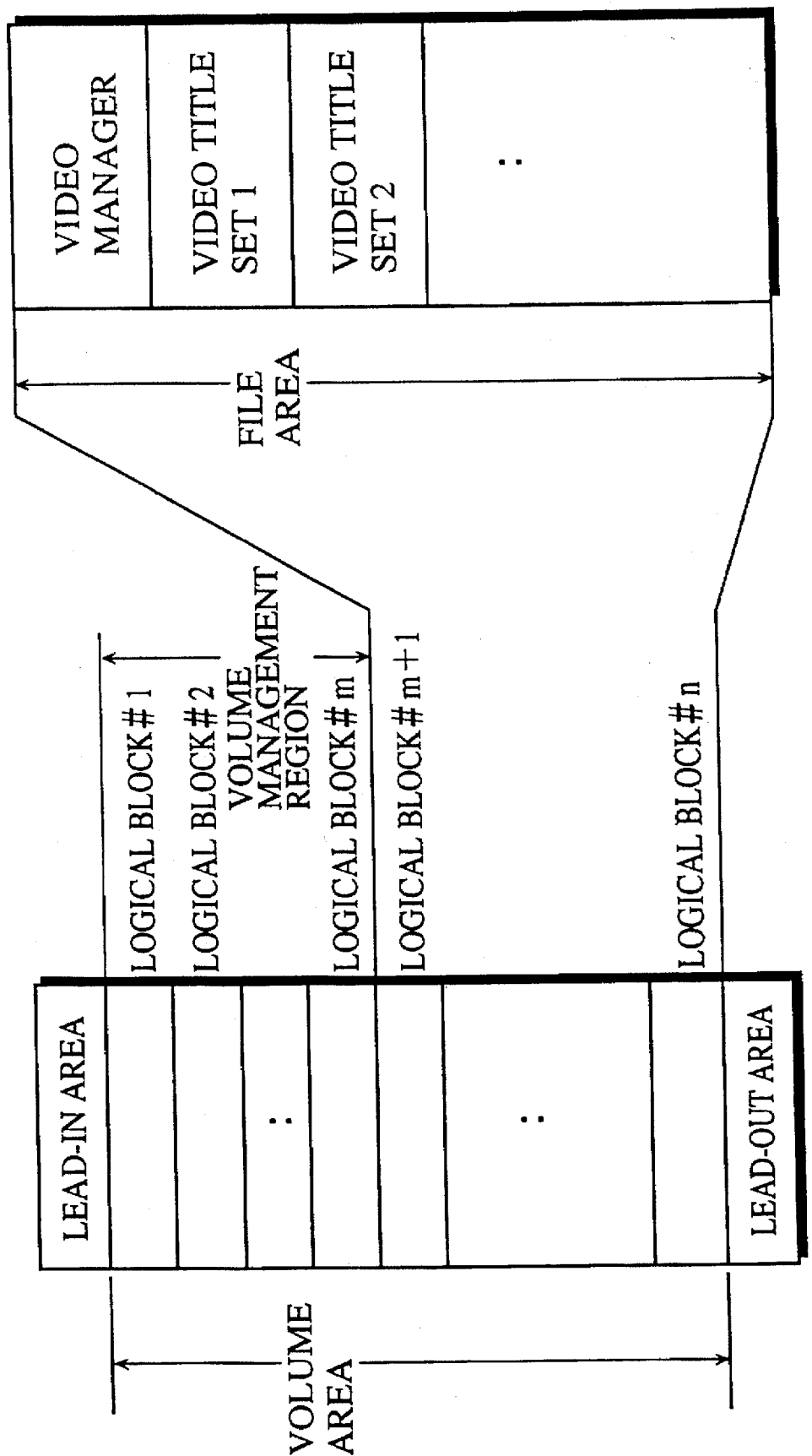
FIG. 4 shows a simplification of the data construction for the entire optical disc.

FIG. 4 shows a simplification of the data construction of the entire optical disc in the present embodiment.

As shown in this drawing, the areas on the optical disc which store data can be broadly classified into a lead-in area, a volume area and a lead-out area. Here, the volume area is further made up of a volume management area and a file area, with this file area being made up of a video manager file (hereinafter abbreviated to "video manager") and a plurality of video title set files (hereinafter abbreviated to "video title sets"). For ease of understanding, the following explanation deals with the case where only file makes up each of the video manager and the video title set, although the increase in the size of the file when storing a movie makes it desirable to have these files divided into a plurality of smaller consecutive files to assist in the file management performed by the reproduction device.

The "lead-in area" is located at the innermost part of the optical disc and stores data to stabilize operation at the start of retrieval by the reproduction device and a parental information table. This parent information table is reproduction control information relating to ratings for achieving parental locks customized to different countries. Accordingly, it shows at what level the title recorded on the disc should be reproduced in order to conform to the rating systems used in different countries. It should be noted here that while the parental information table is described here as being recorded in the lead-in area, it may be recorded in any area Df the disc, with one example being the arrangement of such information into one file in the volume area, or as one part of the video manager described below.

The "lead-out area" is located at the outermost part of the optical disc and stores data which shows that the volume area has ended.

The "volume area" is located between the lead-in area and the lead-out area and is made up of an extremely large number of logical blocks (called "sectors") which are physically arranged onto a spiral track as a one-dimensional array. Each logical block is made up of 2 KB (kilobytes) and is distinguished from the others using a block number (sector address). This logical block size is the smallest unit for retrieval by the reproduction device.

The "volume management area" takes up a necessary number of blocks starting from the first block and is used to manage the entire disc. It stores information for the files in the file area according to ISO (International Standards Organization) 13346.

The "video manager" in the file area expresses the management information for the entire disc. This video manager includes information for expressing a volume menu which is a menu for setting/changing the reproduction control for the entire volume. It also stores a title search pointers as index information for finding the storage location of a selected title on the disc.

The "video title set" has a size which is an integer multiple of logical blocks or, in other words, 2048 bytes*n, and stores a plurality of video objects (hereinafter abbreviated to VOB) which compose a title set and information for reproduction control of VOB. Here, the title set (hereinafter also referred to as "title group") when three versions of a same movie title (a "General", an "R" and an "Adult" version for different ratings) are recorded are the names of these three versions. Since VOBs can be common to these different versions of the title, each video title set stores all of the composite VOBs which include both common VOBs and VOBs unique to only one version.

Data Construction of Video Title Set

Figure 5:
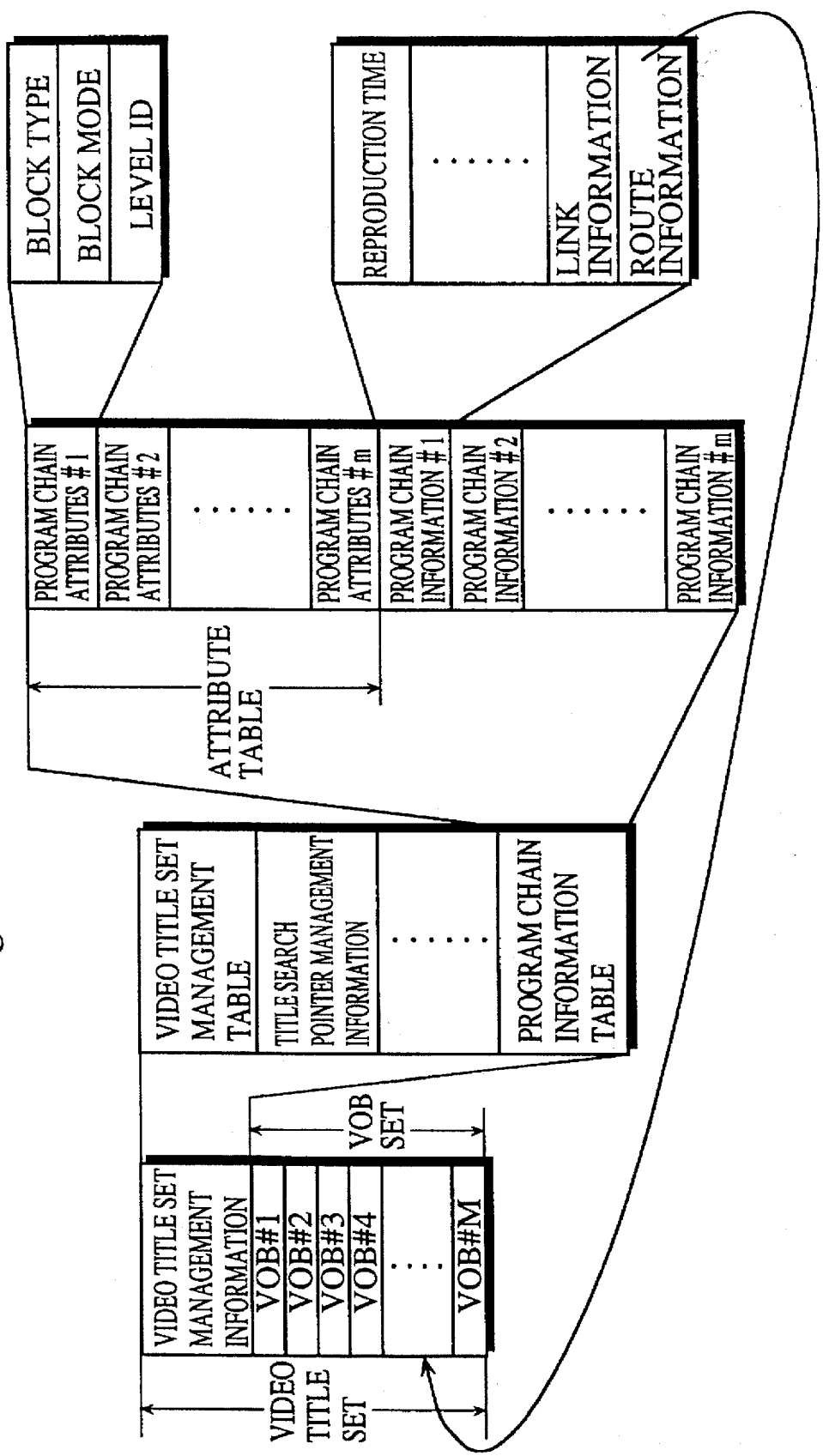
FIG. 5 shows the internal construction of the video title set shown in FIG. 4.

FIG. 5 shows the internal construction of the video title set file in FIG. 4. As shown in this drawing, the video title set is made up of video title set management information and a VOB set.

The VOB set stores a plurality of VOBs which make up one title set. Each VOB is composed of a plurality of sets of audio data, a plurality of sets of sub-picture data and management information which are interleaved together with a set of video data. Since each VOB includes a plurality of sets of audio data, soundtracks in a variety of languages such as English, French, German, Italian, Japanese and Chinese can be recorded together with the video data. In the same, it is possible to use the plurality of sets of sub-picture data to store subtitles in a variety of languages.

The "video title set management information" includes a video title set management table, title search pointer management information, a program chain information table and the like.

The "video title set management table" shows the internal construction, which is to say the contents (such as the kind of information stored or whether there is a table) of the video title set management information.

The "program chain information table" is a table which stores a plurality of entries of program chain information and a plurality of program chain attributes (these attributes being collectively referred to hereinafter as the attribute table) which correspond to each entry of program chain information. In FIG. 5, program chain information #1–#m are written in along with the program chain attributes #1–#m so as to one-to-one correspond with each other. Here, program chain information includes the information given by one program chain, which is to say route information showing a reproduction order of a plurality of VOBs as well as control information relating to the reproduction. In this embodiment, a program chain (hereinafter, PGC) is a list of VOBs which is decided by the reproduction order described above. Here, by setting the route information, the software title developer can freely combine any number of VOBs in their desired order as a PGC. Program attributes, meanwhile, include information such as whether a parental lock level (rating) has been set and, if so, what the set level is.

The "title search pointer management information" shows the plurality of PGCs included in a present video title set and the video title to which this belongs.

The following is a detailed explanation of the PGC information and the PGC attributes.

Each entry of program chain information stores reproduction time, link information and route information.

"Reproduction time" stores the reproduction time of the program chain.

"Link information" stores a pointer showing the PGC information which is to be reproduced after a present PGC. By doing so, a reproduction device can link a plurality of PGC together and reproduce them in order. As one example, one title may be made up of one PGC, three PGCs or a much greater number of PGCs.

"Route information", as shown by the arrow in FIG. 5, expresses the reproduction order of the VOBs which compose the program chain in question and is made up of a list of pointers for indicating the logical address of the storage position of each VOB on the optical disc. A list of these pointers is given in reproduction order of each of the VOBs which form the PGC. As one example, the route information for PGC information #1 is made up of pointers which show each of VOBs #1 through #3, while the route information for PGC information entry #2 can be made up of pointers which show each of VOBs #4 through #6, thereby indicating a selected reproduction order of VOBs. This is to say, by using PGC information #1, first VOB#1 is reproduced, with this being followed by VOB#2 and finally VOB#3. Similarly, by using PGC information #2, first VOB#4 is reproduced, with this being followed by VOB#5 and finally VOB#6.

It should be noted here that the data composition of the video title set is the same as the data composition (not illustrated) of the video manager, with them each only storing a necessary number of items. Here, the video title set management information and the video title set management table in the video title set are respectively called the video manager management information and the video manager management table in the video manager. The video manager differs for the video title set mainly in that it stores a volume menu for allowing the user to select a title. This volume menu is stored in the same way as a title using PGC information (which is in turn made up of one or more VOB).

Figure 6:
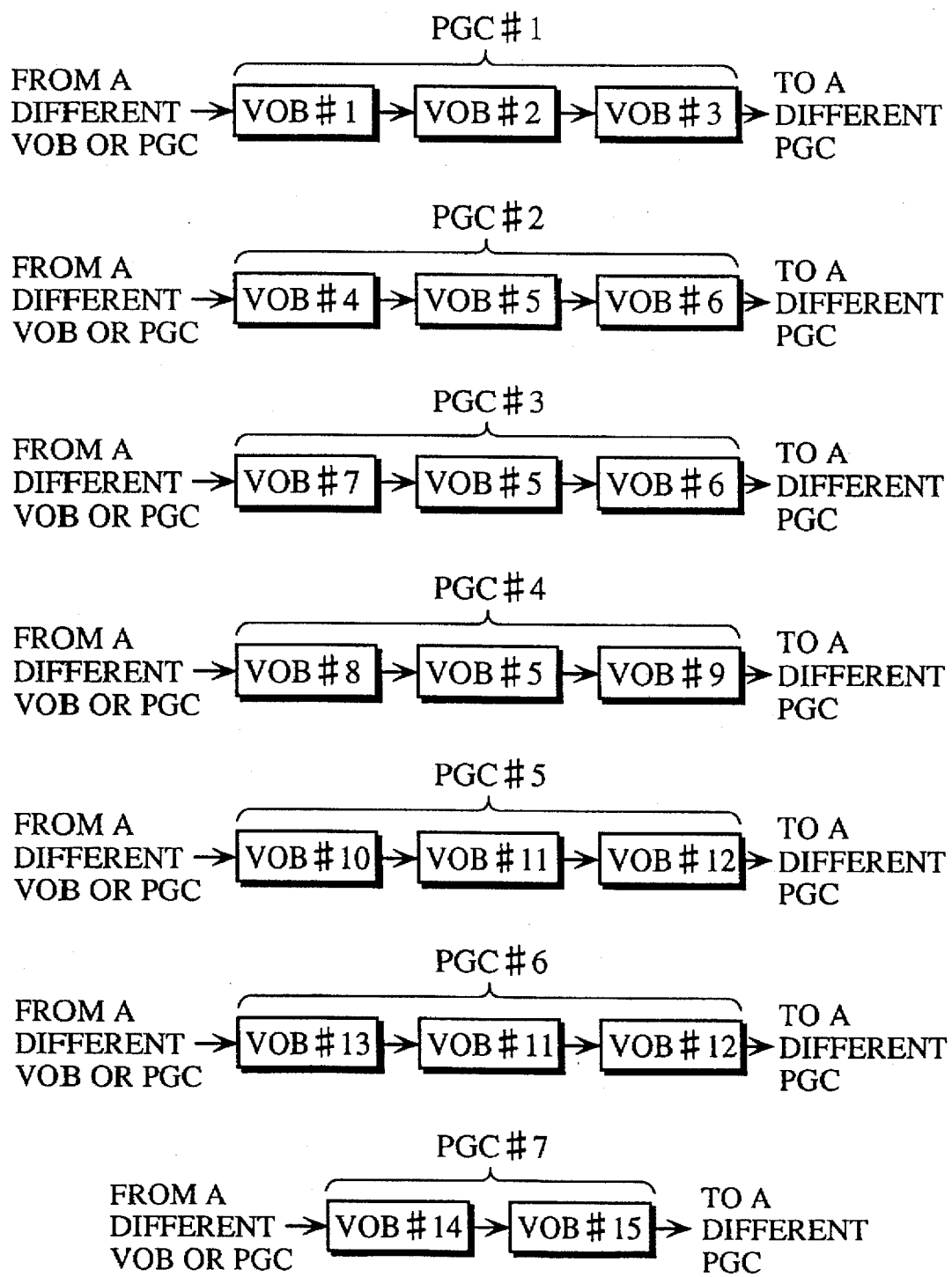
FIG. 6 shows the relation between VOBs and PGCs indicated by the route information.

FIG. 6 shows the relationship between PGCs and VOBs. In this drawing, PGC #1 is made up of three VOB#1-#3. In this case, the route information of PGC information #1 indicates the logical addresses of the storage positions on the optical disc of VOB#1-#3. In the same way, PGC#2-PGC#7 are made up of VOB as described below.

PGC#2=VOB#4, #5, #6

PGC#3=VOB#7, #5, #6

PGC#4=VOB#8, #5, #9

PGC#5=VOB#10, #11, #12

PGC#6=VOB#13, #11, #12

PGC#7=VOB#14, #15

Here, reproduction of each PGC is begun on the completion of reproduction of another PGC (when indicated by a post-processing command) or when there has been a branch during the reproduction of a VOB in a different PGC.

Also, for the example shown in FIG. 6, VOB#5 is commonly used by each of PGC#2-#4, VOB#6 is commonly used by each of PGC#2 and PGC#3 and VOB#11 and #12 are commonly used by each of PGC#5 and PGC#6. This use of VOBs is due, for example, to the selective reproduction of one of PGC#2 and PGC#3 as different versions of a same movie, with VOB#4 and VOB#7 being unique to each version and VOB#5 and VOB#6 being common to each version.

The following is a description of the details of the PGC attribute table.

FIG. 7 shows a detailed example of the attribute table shown in FIG. 5. Here, each entry of the PGC information table (attribute table) is composed of a block type, a block mode and a level ID.

"Block type" shows whether the PGC corresponding to the PGC attribute has been converted into a block. As a specific example, PGC#2, #3 and #4 are parts of a same film which belong to different versions and which are reproduced selectively. In this case, PGC information #2-#4 are stored consecutively in the PGC information table, with PGC attributes #5 and #6 also being stored consecutively in the PGC information table (in the attribute table). These PGC attributes #2, #3 and #4 have "block" set as their block types, while the PGCs which have not been block converted having their block type set as "non-block".

"Block mode" is set as "null" when the PGC corresponding to a PGC attribute has not been block converted ("non-block"), while, when the PGC has been block converted, it indicates the storage position in the block of the PGC attribute in the PGC information table, this storage position being one of the start, middle or end of the block. As a specific example, since the PGC attributes #2-#4 are stored consecutively in the PGC information table the respective block modes are set as start, middle and end. Here, if the PGC information which composes one block is recorded consecutively in the PGC information table, the order in which it is saved is not important. This is also the case for PGC attributes.

Each "Level ID" is a level which is present inside a title and which determines what video data can be selectively reproduced in accordance with the rating, with a level ID being set for each PGC. It should be noted here that these levels are independent of the motion picture ratings systems in different countries. For ease of understanding, these levels have been given the name "reproduction levels" in the following explanation.

In the present embodiment, eight levels L1-L8 are used, with L1 being the most restricted level and L8 being the least restricted. For the example given above, the level IDs of PGC attributes #2, #3 and #4 are L2, L5 and L8, respectively. Here, out of the PGCs in a block, the reproduction device reproduces only the PGC whose level ID corresponds to the reproduction level allowed by the user (especially by parents) or a PGC whose content is less restricted.

For the example attribute table shown in FIG. 7, three versions of a film, L2, L5 and L8, (which correspond, for example, to the Japanese rating system of "General viewing", "R" and "Adult") are made up of PGC#1-PGC#7 as shown in FIG. 6.

Figure 8A:
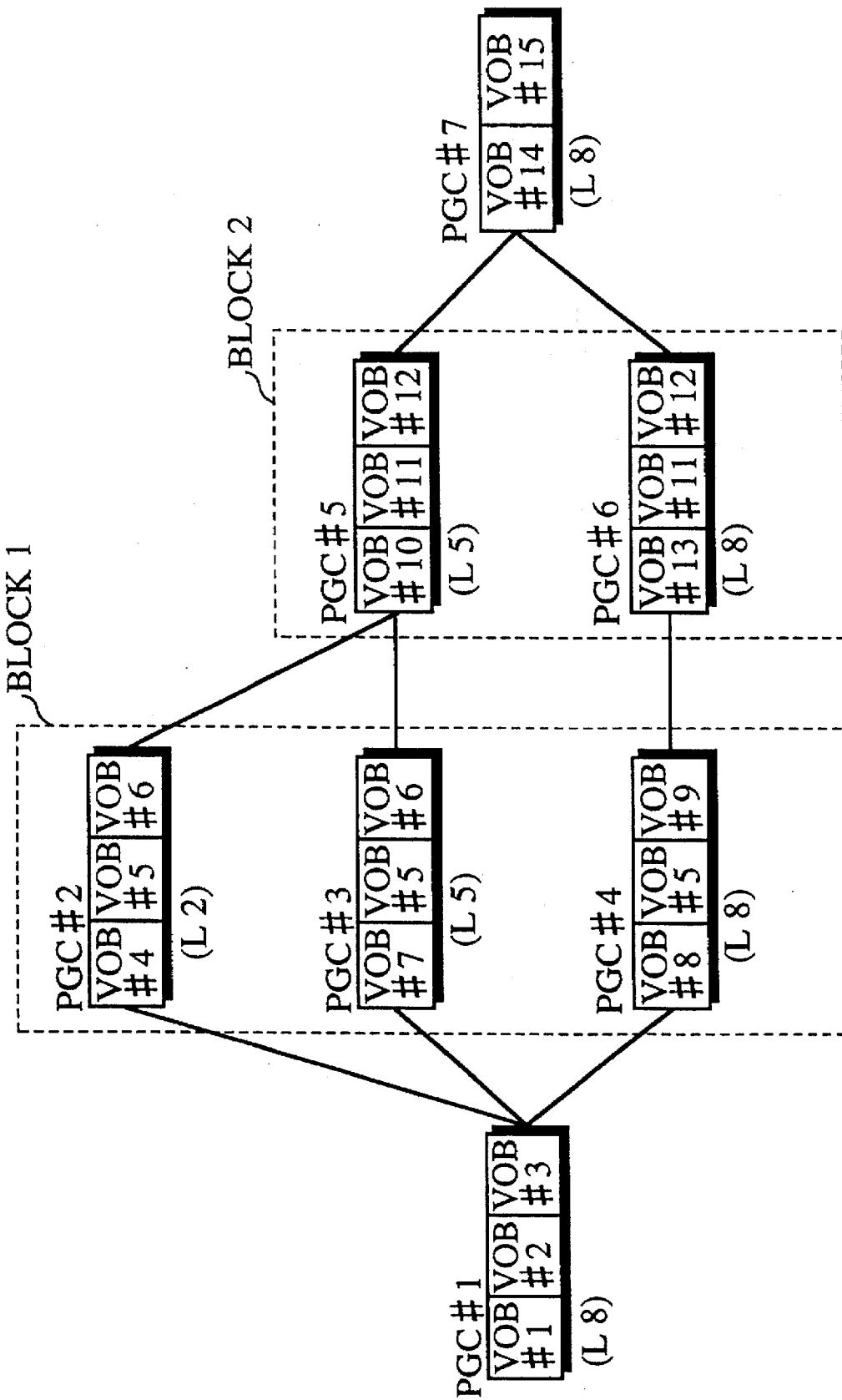
FIG. 8A shows how the three versions of the movie shown in FIG. 6 (title group 1) are composed of PGCs.

FIG. 8A shows how the three versions of the film (hereinafter referred to as title set 1 or title group 1) shown in FIG. 6 are made up of PGC. Here, version L2=PGC#1→PGC#2→PGC#5→PGC#7 version L5=PGC#1→PGC#3→PGC#5→PGC#7 version L8=PGC#1→PGC#4→PGC#6→PGC#7.

For the example above, PGC#2, PGC#3 and PGC#4 are treated so that only one of them is selected and reproduced in accordance with the chosen level. PGC#5 and PGC#6 are also treated so that only one of them is selected and reproduced in accordance with the chosen level. PGC#1 and PGC#7, meanwhile, are treated as non-blocks and so are reproduced regardless of the chosen level. For this situation, the block type, block mode and level ID are set in the attribute table as shown in FIG. 7. Here, when a branch address PGC is a PGC which belongs to one of the blocks described above, it is not necessary for the link information in the branched-from PGC to include pointers for all of the PGCs in the block, so that it only needs to store a pointer for the first PGC information in the block. As a result, when a branch is made to a PGC in a block where selective reproduction is performed, the reproduction device can use the PGC attribute stored in the link information to search the entries which compose the block and selectively reproduce a PGC with an appropriate reproduction level. Since entries for PGC attributes which belong to a same block are arranged consecutively in the attribute table, the reproduction device can be quickly complete its search for an appropriate entry. As an example, a branch from PGC#1 to any of PGC#2, PGC#3, PGC#4 can be made by merely setting "PGC#2" in the link information for PGC#1.

Figure 8B:
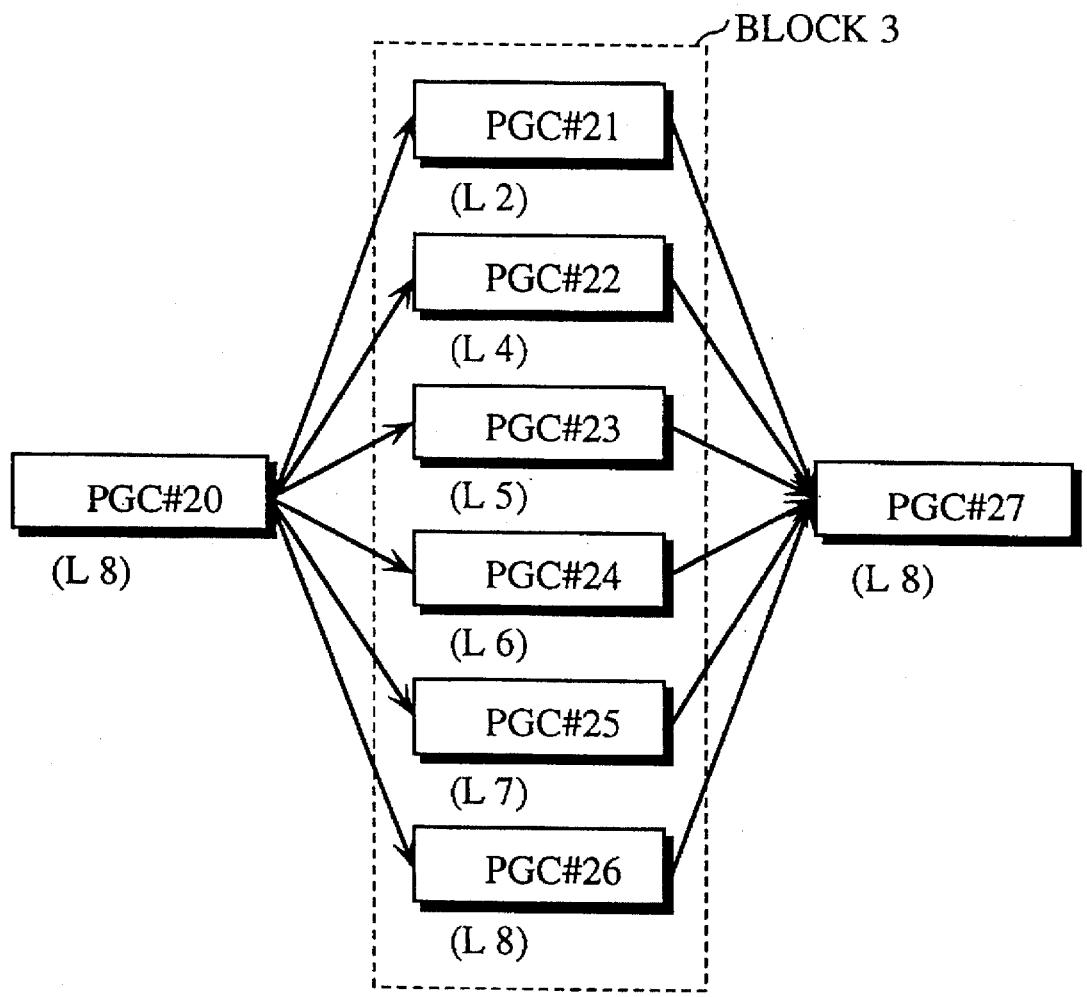
FIG. 8B shows how the six versions of the movie shown in FIG. 6 (title group 2) are composed of PGCs.

Similarly, FIG. 8B shows how six versions of a film (hereinafter referred to as title set 1 or title group 1) are made up of PGCs. In this case, version L2=PGC#20→PGC#21→PGC#27 version L4=PGC#20→PGC#22→PGC#27 version L5=PGC#20→PGC#23→PGC#27 version L6=PGC#20→PGC#24→PGC#27 version L7=PGC#20→PGC#25→PGC#27 version L8=PGC#20→PGC#26→PGC#27

Of these PGCs, PGC#21 to PGC#26 are set as a block using the PGC attribute table as described above. Also, the VOB which make up PGC#20–PGC#27 are stored as one video title set (for example, video title set 2).

Also, FIG. 8B shows how two versions of a film (hereinafter referred to as title group 3) are made up of PGCs. In this case, version L2=PGC#30→PGC#31→PGC#33 version L8=PGC#30→PGC#32→PGC#33

Video Objects (VOBs) recorded on a DVD

FIG. 9 shows how compressed video data and compressed audio data compose the combined data stream called a VOB. This drawing shows the original video data stream, audio data stream and sub-picture data stream together with the VOB. This illustrated example conforms to the compression method and data format stipulated under MPEG2 (Moving Pictures Experts group, ISO13818).

In this example, "video data stream" is a serial video data stream which has been compressed and divided into sections called GOPs (groups of Pictures), with these being expressed as "video 1, video 2, video 3 . . . ." in the drawing. This GOP is the unit for decompression of the compressed data and includes about 12–15 frames of video data which equates to a reproduction time of around 0.5–1.0 seconds. Each GOP is made up of a plurality of video packs which are converted into packs at 2 KB intervals.

Similarly, "audio data stream" is composed of a compressed audio signal which includes left and right channel components of stereo sound and a "surround" component, with three kinds of audio A, B and C being expressed as "audio A-1, audio A-2 . . . ", "audio B-1; audio B-2 . . . " and "audio C-1, audio C-2 . . . " in the FIG. 9. Here, audio A-1, audio A-2 etc. are each made up of one or more audio packs which are converted into packs using 2 KB units.

"Sub-picture data stream" is a data stream which includes compressed graphics, with there being two kinds of sub-picture which are expressed as "SP A-1, SP A-2 . . . " and "SP B-1, SP B-2 . . . " in FIG. 9. Here, SP A-1, SP A-2 etc. are each made up of one or more sub-picture packs which are converted into packs using 2 KB units.

Each of the video data stream, the audio data stream and the sub-picture data stream are interleaved together in the VOB. The cycle used for this interleaving is indicated by the GOP unit in the drawing.

It should also be noted that in the present embodiment management information (PCI) is interleaved into the VOB. The smallest unit in the VOB which includes management information (PCI) and the other data is hereinafter called a VOB unit (hereinafter, VOBU). Here, information for achieving interactive reproduction is written in this management informationl Here, the reason these packs are given a size of 2 KB is that it coincides with the smallest retrieval unit for the reproduction device, which is to say the same size as the logical blocks (sectors) shown in FIG. 4. Also, the management information (PCI) is distributed so that each VOBU contains one set (pack) of management information (PCI).

Figure 10:
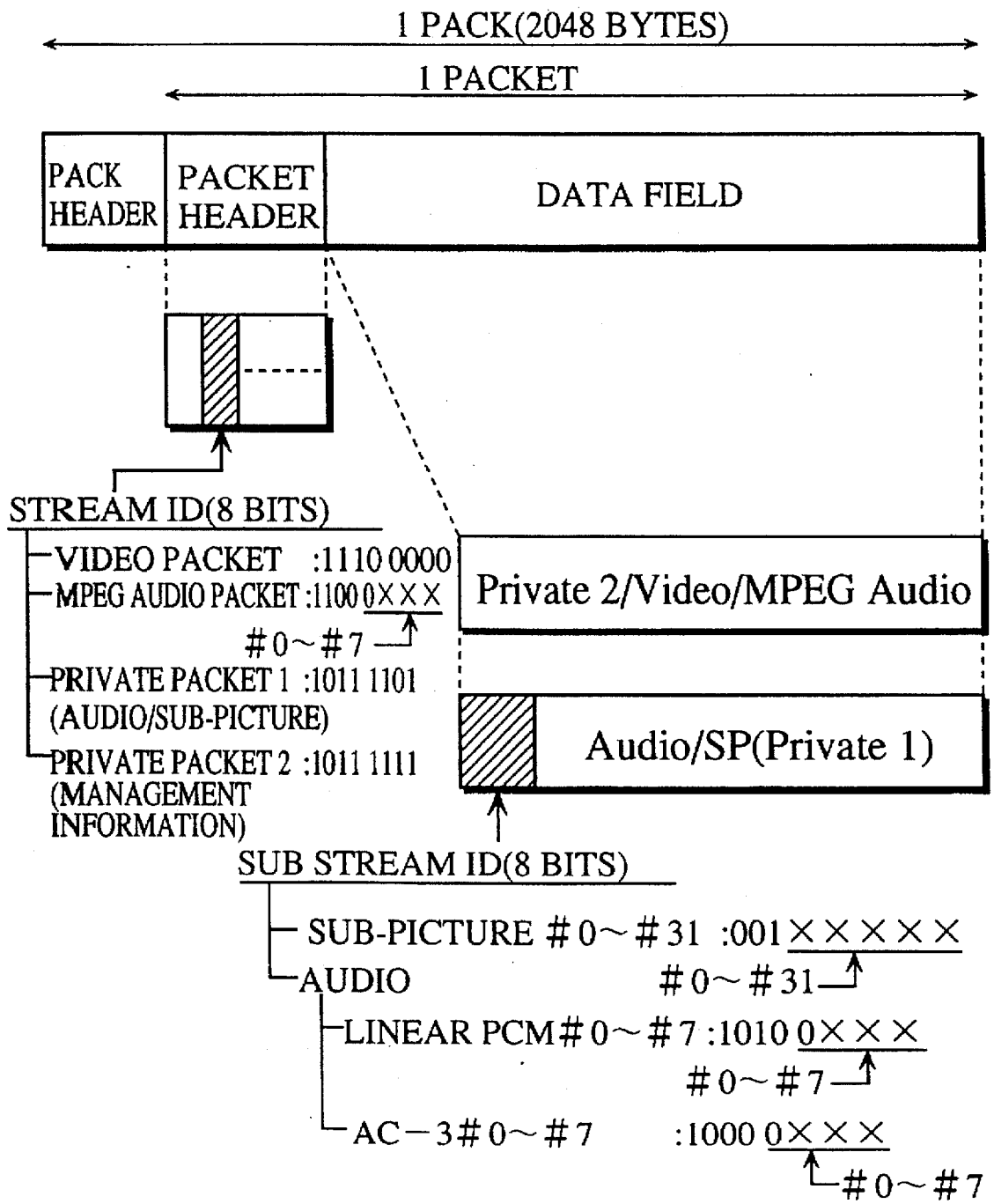
FIG. 10 shows the data formats of each of the video data, audio data, sub-picture data and management pack data which are interleaved in a VOB.

FIG. 10 shows the data format of each of the video data, audio data, sub-picture data and management information (PCI) which are interleaved in a VOB. Each kind of data in the illustrated VOB has been converted into packets and packs according to MPEG2 standard. In this embodiment, each pack contains one packet called a PES (Packetized Elementary Stream) and is made up of a pack header, a packet header and a data field which together take up 2KB. The contents of the "pack header" and "packet header" conform to MPEG2 standard, so that their explanation has been omitted and the following explanation will focus on the information used to express the different kinds of data.

The "stream ID" included in the packet header is an eight-bit field which shows whether the packet is a video data packet for a video data stream, a private packet, or an MPEG audio packet. Here, a "private packet" is data whose content can be freely defined under MPEG2 standard. In the present embodiment, private packet 1 is defined as audio data and sub-picture data while private packet 2 is defined as management information (PCI).

Private packet 1 further includes substream ID, which is an eight-bit field for showing whether the packet contains audio data or sub-picture data. The audio data defined by private packet 1 has a maximum of eight kinds of settings #0–#7 for each of linear PCM format and AC-3 format. The sub-picture data has a maximum of thirty-two kinds of settings #0–#31.

Here, for video data, the "data field" is made up of MPEG2 compressed data. For audio data, the "data field" is made up of data in one of MPEG, linear PCM or AC-3 format. Finally, for sub-picture data, the "data field" is made up of graphics data or the like which has been compressed using run-length encoding.

Here, the reason these packs are given a size of 2 KB is that it coincides with the smallest retrieval unit for the reproduction device, which is to say the same size as the logical blocks (sectors) shown in FIG. 4.

Parental Information Table

Figure 11:
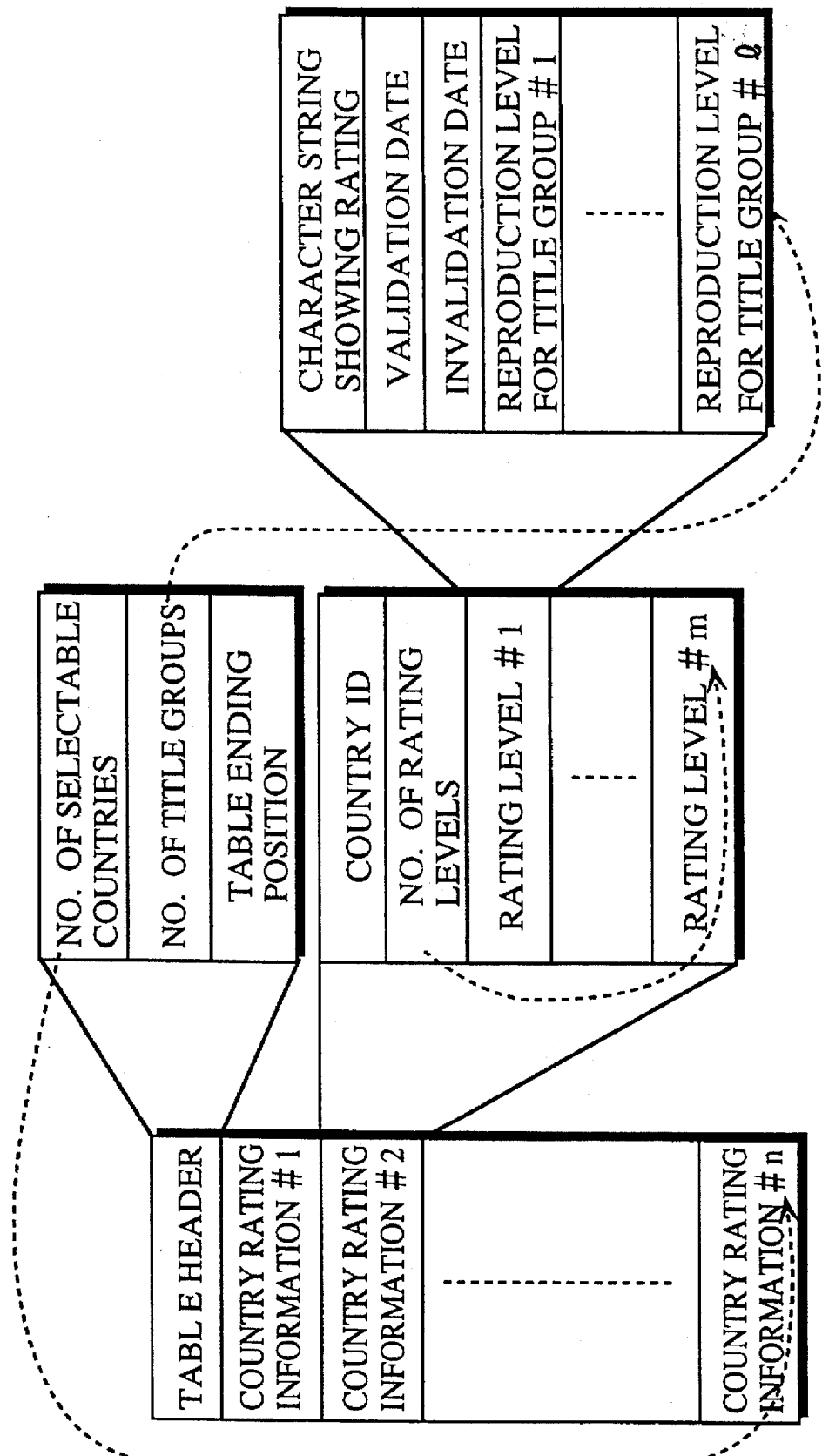
FIG. 11 shows the composition of the parental information table stored in the lead-in area in FIG. 4.

FIG. 11 shows the composition of the parental information table recorded in the lead-in area shown in FIG. 4. The parental information table shown in this figure is made up of a table header and a plurality of sets of country rating information #1–#n.

The "table header" is made up of a "number of selectable countries" showing the number n of countries for which country rating information is provided, a "number of title groups" which shows the number k of title groups (title sets) recorded on the present disc and an "end position" which shows the end of the parental information table.

Each "country rating information #1–#n" is made up of a "country ID", a "total number of rating levels" and a plurality of "rating levels". The "country ID" is a code which specifies a country, with as one example, ID#1 specifying Japan, ID#2 specifying the USA and ID#3 specifying Germany. Also, if this code is ID#99 for example, it may collectively refer to all other countries.

The "total number of rating levels" shows the number m of rating levels which are used to identify the range of the projected audience in the country identified by the "country ID". Here, for the above example, the total number of rating levels for ID#1 (Japan) is 3, the total number of rating levels for ID#2 (USA) is 6 and the total number of rating levels for ID#3 (Germany) is 5.

The "rating levels #1–#m" are sets of information related to reproduction control for each title at a given rating level, which include character strings which denote the various ratings, reproduction levels for each title, a validation date and an invalidation date.

The character strings which denote the various ratings store character codes which show the names of the ratings. For the example of country ID#1 (Japan), rating level#1 is "Adult", rating level#2 is "R" and rating level#3 is "General". For the example of country ID#2 (USA), rating level#1 is "X", rating level#2 is "NC-17", rating level#3 is "R", rating level#4 is "PG-13", rating level#5 is "PG", and rating level#6 is "G".

The reproduction levels for each title #1–#L correspond to the rating levels and show the reproduction levels for title group #1–#L. These reproduction levels show one of a plurality of levels (the aforementioned L1–L8) which can be distinguished inside the reproduction device. As one example, the rating "Adult" in Japan can correspond to reproduction level L2 for title 1 and reproduction level L4 for title 2, so that the reproduction level can be different even when the rating level is the same. By doing so, the differences between rating levels in different countries can be handled flexibly.

More specifically, the relationship between rating levels and reproduction levels can be set as follows for the content of a title group.

EXAMPLE 1—Japan

"Adult"→any of L1–L4
"R"→any of L3–L5
"General"→any of L6–L8

EXAMPLE 2—USA

"X"→any of L1–L3
"NC-17"→any of L3–L4
"R"→any of L4–L5
"PG-13"→any of L5–L6
"PG"→any of L6→L7
"G"→any of L7–L8

In the same way, the five rating levels used in Germany, the three rating levels used in Italy and the four rating levels used in Australia can be related to reproduction levels. This is the same for countries other than those mentioned above.

When specific dates are set in the "validation date" and "invalidation date", these show the date from which the reproduction levels for a title corresponding to each rating level become valid and the date on which they are invalidated. By setting these dates, it is possible to record titles whose valid reproduction period is limited on a disc.

Specific Example of a Parental Information Table

Figure 8C:
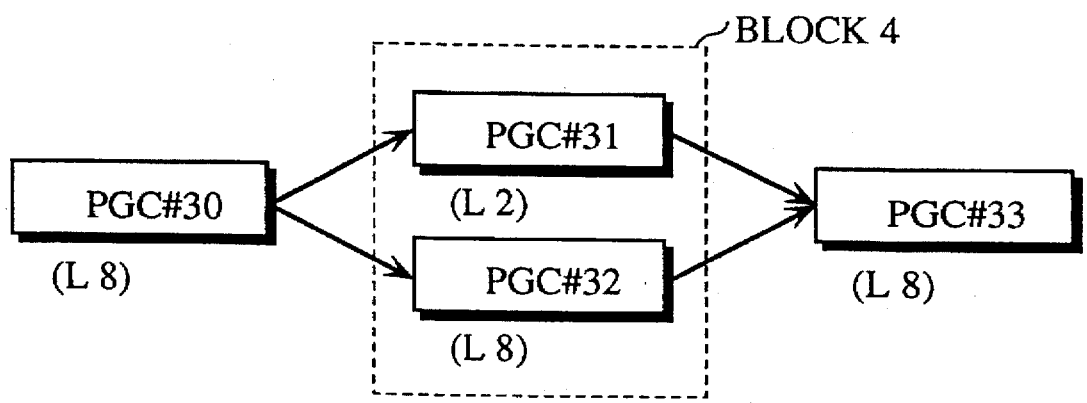
FIG. 8C shows how the two versions of the movie shown in FIG. 6 (title group 3) are composed of PGCs.
Figure 12A:
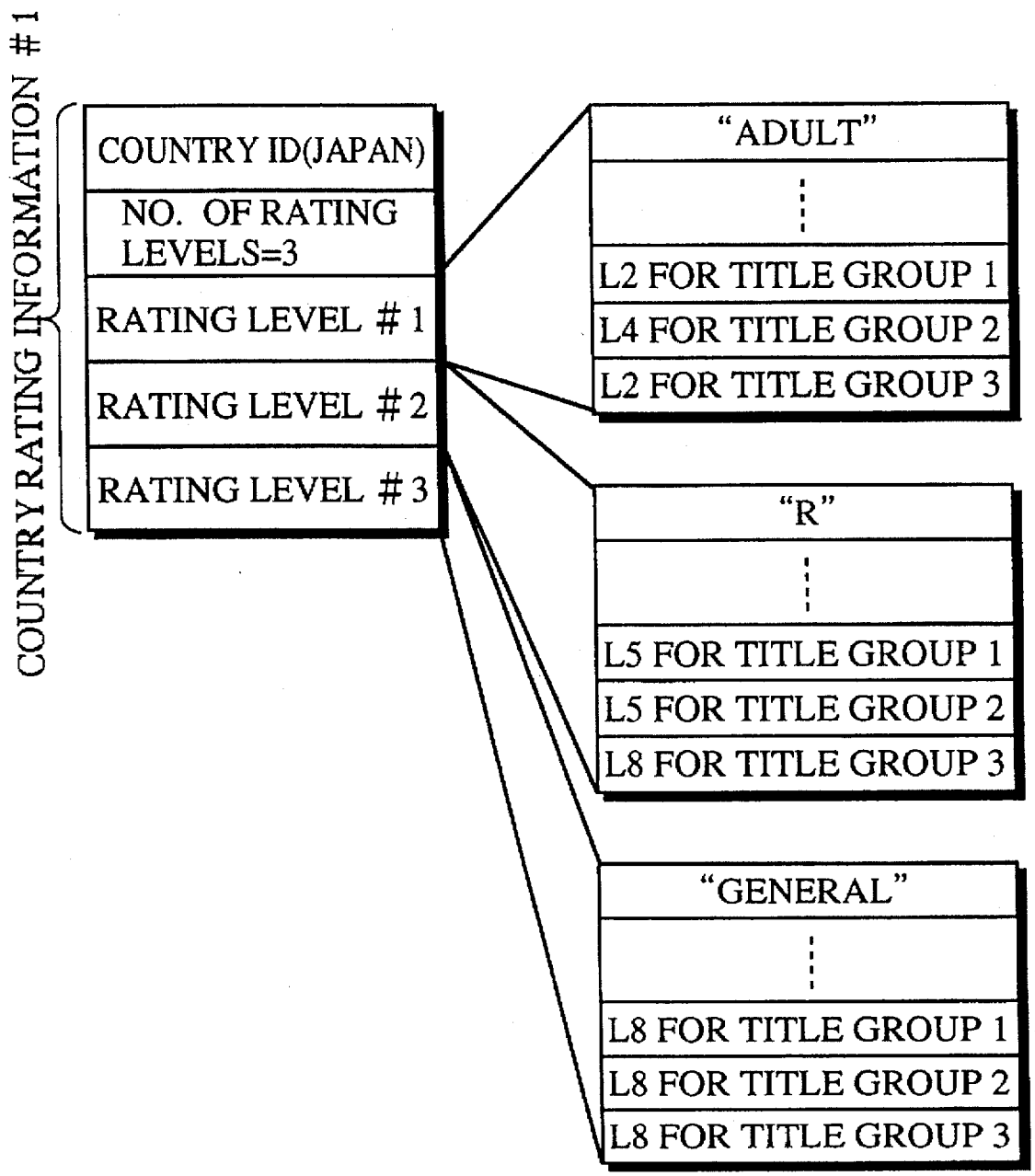
FIG. 12A shows an example of country rating information#1 in the parental information table of FIG. 11.
Figure 12B:
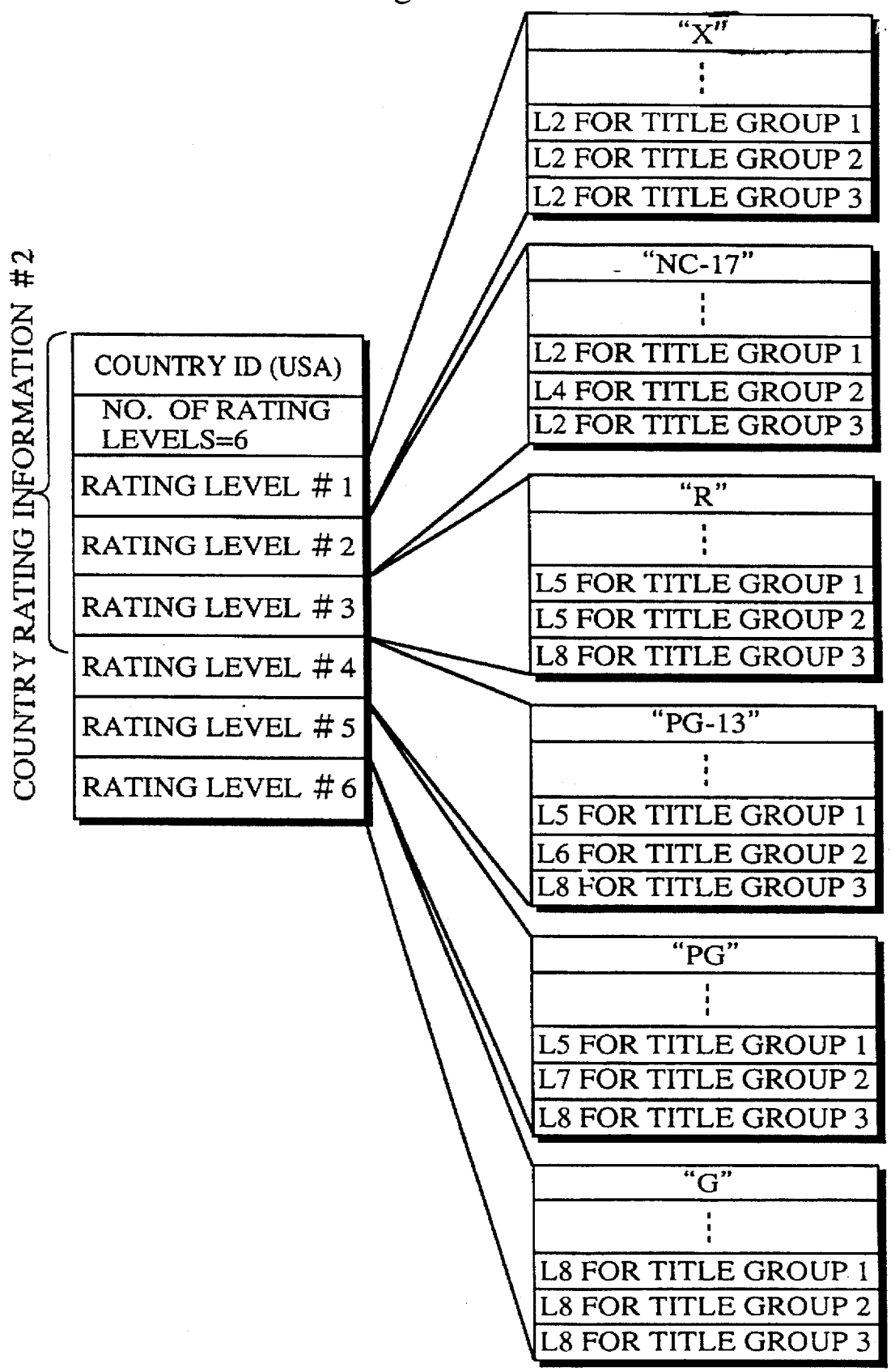
FIG. 12B shows an example of country rating information#2 in the parental information table of FIG. 11.

FIG. 12A and 12B show examples of country rating information #1 (Japan) and country rating information #2 (USA) in the parental information table shown in FIG. 11. The title groups 1, 2 and 3 in these figures are conceived from the content of FIGS. 8A, 8B and 8C, and so are titles respectively made up of three versions, six versions and two versions.

In FIG. 12A, title groups which correspond to the three rating levels in Japan are shown related to the reproduction levels of the reproduction device. As one example, the reproduction levels L2, L4 and L2 respectively relate to title groups 1, 2 and 3 for the rating level "Adult".

In FIG. 12B, title groups which correspond to the six rating levels in the USA are shown related to the reproduction levels of the reproduction device. As one example, reproduction level L2 relates to title group 1 for the rating levels "X" and "NC-17".

In this kind of parental information table, rating systems (number of ratings and rating levels) which differ from country to country are related to the reproduction levels of the reproduction device, so that information can be related to any rating system used in any country.

This concludes the description of the data construction of the optical disc, so that the following explanation will describe the construction of the reproduction device.

Outline of the Reproduction System

Figure 13A:
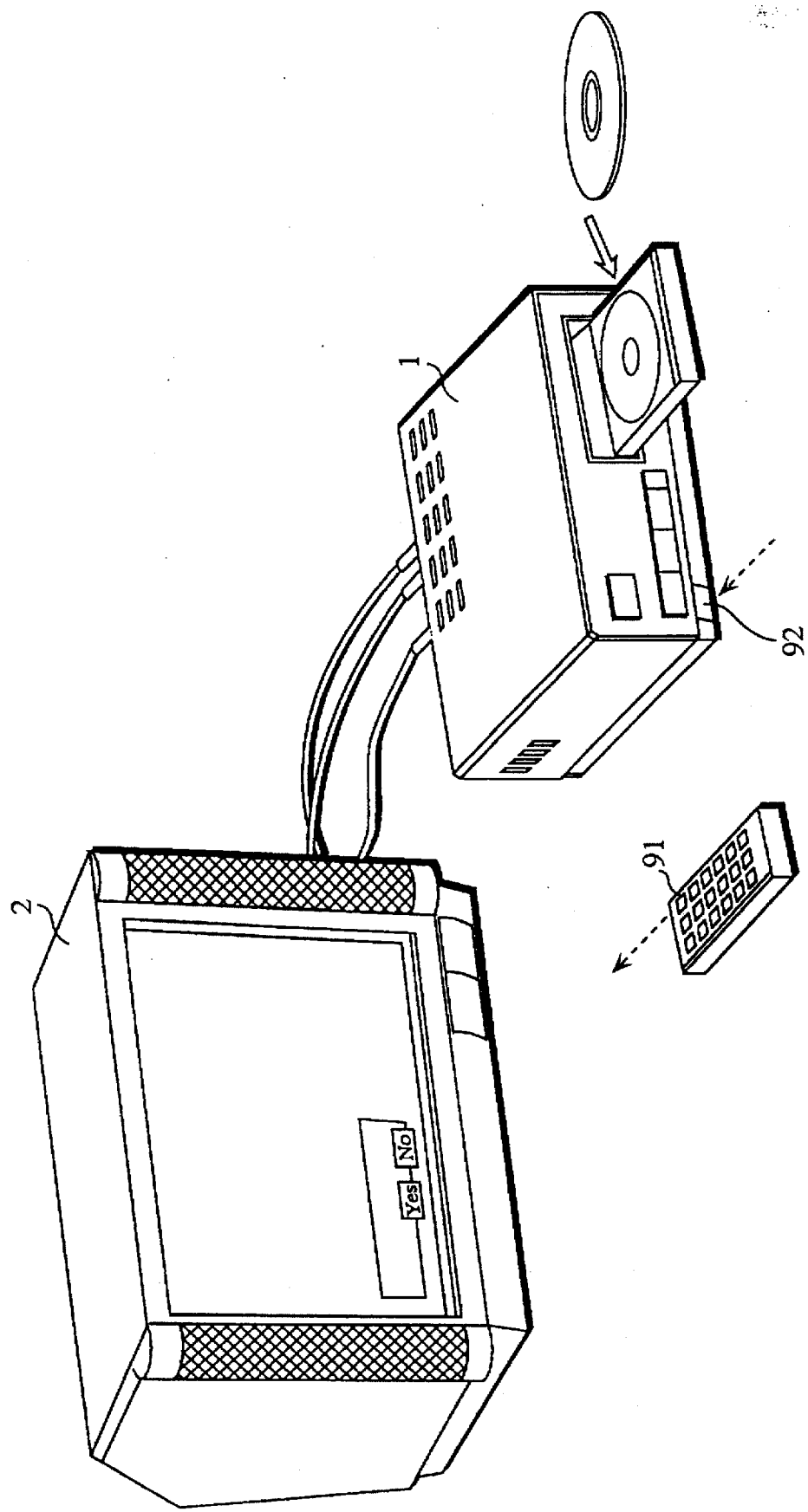
FIG. 13A shows a perspective view of the reproduction device of the present embodiment.

FIG. 13A shows the appearance of the reproduction system of the present embodiment which is made up of a reproduction device, a monitor and a remote controller.

As can be seen in the drawing, the reproduction device 1 reproduces the DVD described above in accordance with operation indications made using the remote controller 91 and outputs an image signal and an audio signal. Here, the operation indications made using the remote controller 91 are received by the remote control reception unit 92 of reproduction device 1.

Display monitor 2 receives the image signal and the audio signal from reproduction device 1 and displays an image output and an audio output. This display monitor 2 can be a conventional television set.

Entire Construction of the Reproduction Device

Figure 13B:
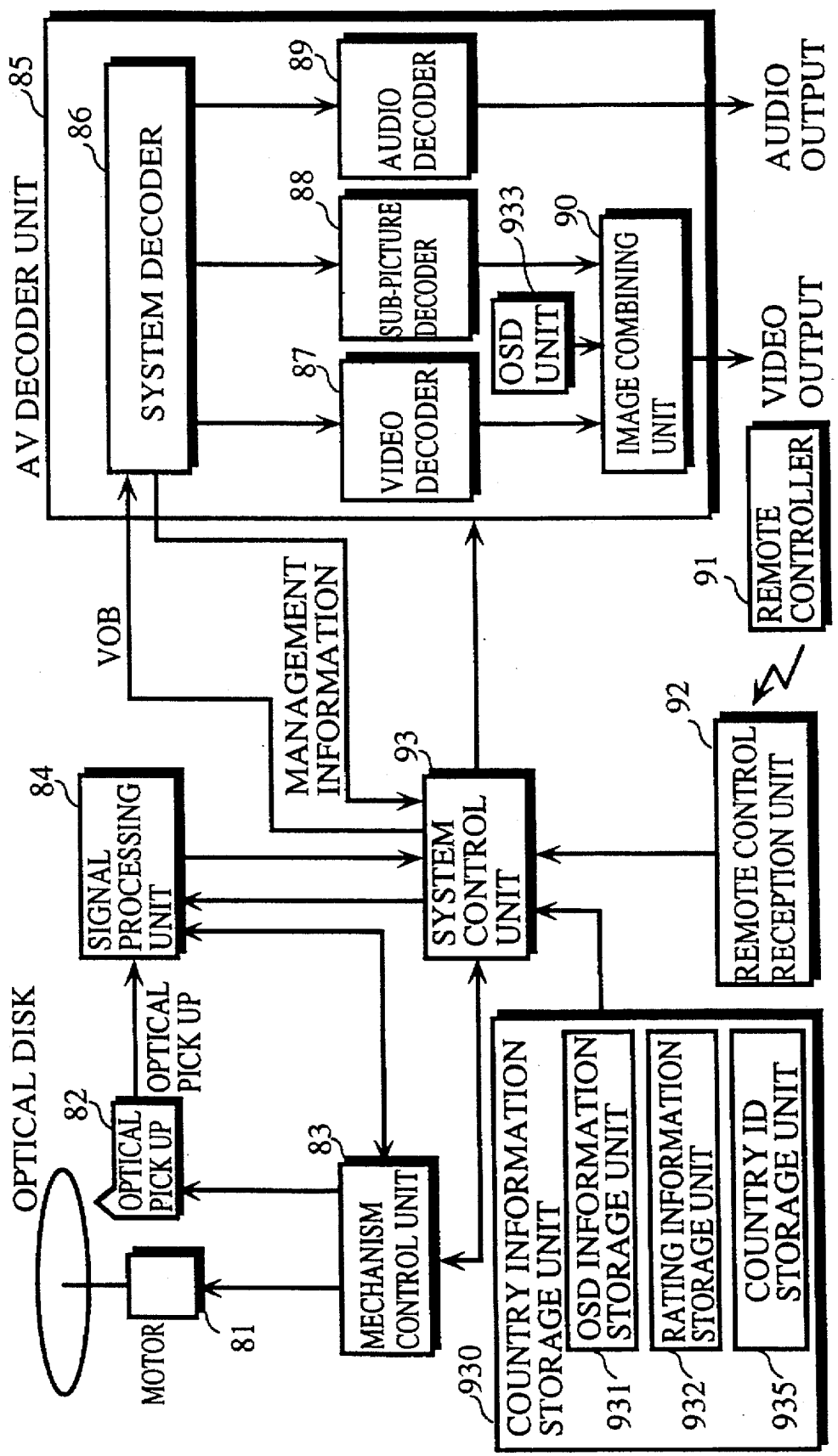
FIG. 13B is a block diagram showing the entire reproduction device in the embodiment of the present invention.
Figure 13C:
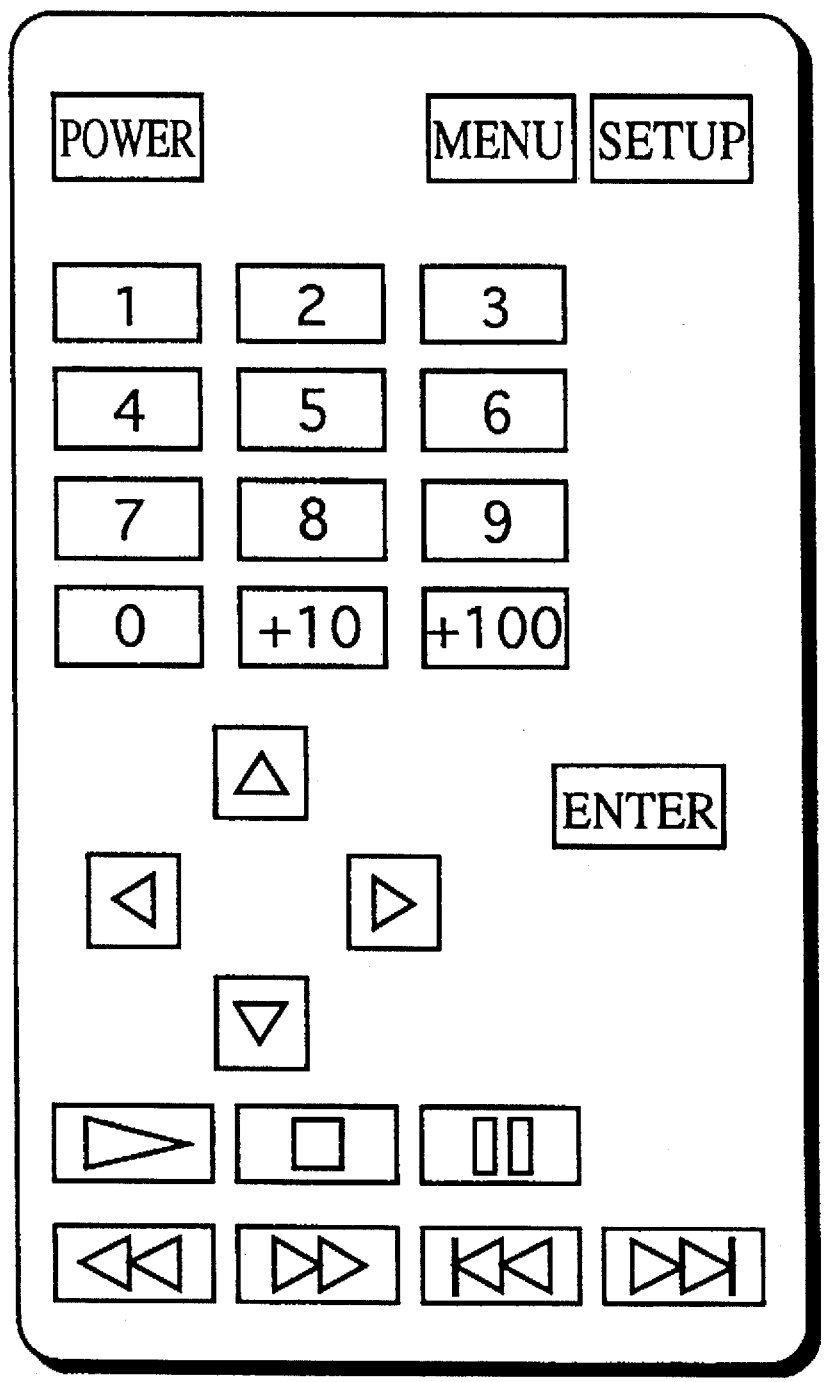
FIG. 13C shows an example key arrangement of the remote controller 91 used with the present reproduction device.

FIG. 13B shows a block diagram for the entire construction of the reproduction device in the present embodiment. The reproduction device is made up of a motor 81, an optical pickup 82, a mechanism control unit 83, a signal processing unit 84, an AV decoder unit 85, a remote controller 91, a remote control reception unit 92, a system control unit 93, a country information storage unit 930 and a nonvolatile memory 940. The AV decoder unit 85 is further composed of a system decoder 86, video decoder 87, a sub-picture decoder 88, an audio decoder 89, an image combining unit 90 and an OSD (On Screen Display) unit 933. Also, the country information storage unit 930 is made up of an OSD information storage unit 931, a rating information storage unit 932 and a country ID storage unit 935.

The mechanism control unit 83 controls the mechanism which includes the motor 81 for driving the disc and the optical pickup 82 for reading the signal recorded on the disc. More specifically, the mechanism control unit 83 adjusts the speed of the motor in accordance with the track position indicated by the system control unit 93 while at the same time moving the pickup position by driving the actuator of the optical pickup 82 and, having detected a desired track through servo control, waiting until the revolution of the disc has reached the point where the desired sector is recorded before finally continuously reading the signal from the desired position.

The signal processing unit 84 executes signal processing, such as amplification, wave-shaping, demodulation, and error correction, for the signal read by the optical pickup 82. After this, it stores the signal in logical block units in the buffer memory (not illustrated) of system control unit 93. The data in the buffer memory is read by the system control unit 93 in accordance with the video title set management information and the video manager management information and is transferred from the buffer memory to the system decoder 86 according to control by the system control unit 93 for each VOB.

The AV decoder unit 85 converts the received VOB into the original video signal and audio signal. The system decoder 86 determines the stream ID and substream ID for each packet included in the VOBs transferred from the buffer memory and outputs video data to the video decoder 87, audio data to the audio decoder 89, sub-picture data to the sub-picture decoder 88 and pack management information (PCI) to the system control unit 93. In doing so, the system decoder 86 outputs to the audio decoder 89 and the sub-picture decoder 88 only the audio data and sub-picture data whose number corresponds to the numbers indicated by the system control unit 93, out of the plurality of pieces of audio data and sub-picture data, with the remaining pieces of data being discarded.

The video decoder 87 decodes the video data inputted from the system decoder 86 and, having decompressed the data, outputs it as a digital video signal to the image combining unit 90.

When the sub-picture data inputted from the system decoder 86 is run-length compressed image data, the sub-picture decoder 88 decodes it, decompresses it and outputs it in the same format as the video data to the image combining unit 90.

The audio decoder 89 decodes the audio data inputted from the system decoder 86, decompresses it and outputs it as digital audio data.

The image combining unit 90 combines the output of the video decoder 87 and the output of the sub-picture decoder 88 according to proportions indicated by the system control unit 93 and outputs the result as a video signal. This signal is converted into an analog signal and is then inputted into a display device.

The country information storage unit 930 is composed of ROM (Read Only Memory) and, for each set of stored information, can be divided into subregions made up of an OSD information storage unit 931, a rating information storage unit 932 and a country ID storage unit 935.

The OSD information storage unit 931 stores the OSD information which shows the various operation mode setting menus for the present reproduction device. These operation mode setting menus include a rating setting menu for receiving a setting of parental block information in accordance with a user operation and a player setting menu for changing the default settings for audio data and sub-picture data at the start reproduction. This OSD information is read by the system control unit 93 when the reproduction device has been turned on or reset, or whenever the "Setup" key on the remote controller 91 is depressed.

The country ID storage unit 935 stores the country ID used by the present reproduction device and can be set at the factory before shipping for the intended country of sale.

The rating information storage unit 932 stores the content of the rating system for the country indicated by the country ID stored by the country ID storage unit 935. For the example of Japan, this stores the three levels named "General Viewing", "R" and "Adult", while for the USA, this stores the six levels named "G", "PG", "PG-13", "R", "NC-17" and "X".

The OSD unit 933 converts the image data, which has been converted by the system control unit 93 based on the OSD information, into a digital video signal and outputs it to the image combining unit 90. As a result, the menus for setting the operation modes for the reproduction device, such as the player setting menu and the rating setting menu, are displayed.

The nonvolatile memory 940 is a rewritable memory whose stored content is not lost when the reproduction device is turned off. It is composed, for example, of EEPROM (Electrically Erasable Programmable Read Only Memory) or battery backup RAM (Random Access Memory) and stores information such as the parental lock information which shows the ratings for which reproduction by the present reproduction device is permitted and operation modes set by the user.

The remote controller 91 receives reproduction control indications made by user operations. An example key layout of the remote controller 91 is shown in FIG. 9. The following is a brief explanation of only the keys which specifically relate to the present invention. The "Setup" key is used to call the player setting menu, the "Title" key is used to call the title selection menu which can be displayed at any point during disc reproduction. The numeral keys and arrow keys are used for making menu selections. Finally, the "Enter" key is used for confirming a selected menu item.

The remote control reception unit 92 receives the key signal which is infrared transmitted from the remote controller 91 in response to the depression of a key and informs the system control unit 93 of the key data using an interrupt process.

The system control unit 93 controls the entire reproduction device. It is composed of a program memory for storing a program for realizing the functions of the system control unit, a buffer memory for temporarily storing data for logical blocks and a parental information table, a CPU for executing the program and a general register. More specifically, when the data read from the buffer memory is video title set management information or video manager management information, the system control unit 93 and performs reproduction control for the signal processing unit 84 in accordance with the content of this information, while when the data is a VOB, the data is directly transferred from the buffer memory to the AV decoder unit 85. For the mechanism control unit 83, the system control unit 93 calculates the number of the track on the disc which corresponds to the next logical block to be read, indicates the track position and indicates block reading control to the mechanism control unit 83. Also, on being interrupted by the remote control reception unit 92, the system control unit 93 is informed of the key data corresponding to the depressed key and performs reproduction control corresponding to the key data. The general register includes a register for storing a reproduction level of a title presently being reproduced (called the level register) and a register for storing a combination of the audio data and sub-picture data to be reproduced for the title presently being reproduced (called the language register). Here, the reproduction level at the start of reproduction is set in the level register by the system control unit 93 (any of L1–L8) and is used so that a PGC out of a block of PGCs with a matching reproduction level or next less restricted reproduction level is selected. Also, the audio data number i and the sub-picture data number #j which respectively show the language used for audio and subtitles corresponding to the country ID stored in country ID storage unit 935 are set in the language register when the reproduction device is turned on or when the reproduction of a title is commenced.

The system control unit 93 also reads the OSD information in the OSD information storage unit 931 after reproduction device is turned on or whenever it detects that the "Setup" key on remote controller 91 has been depressed. By converting the read OSD information into image data and outputting it to the OSD unit 933, the player setting menu (not illustrated in the drawings) is displayed and the operation mode of the reproduction device is set in accordance with a user operation. The setting of this operation mode includes settings which relate to the ratings system. More specifically, when the user specifies the rating setting menu out of the player setting menu, parental lock information is stored in the nonvolatile memory 940 in accordance with the user indication made using the keys on the remote controller 91.

Construction of the System Decoder 86

Figure 14:
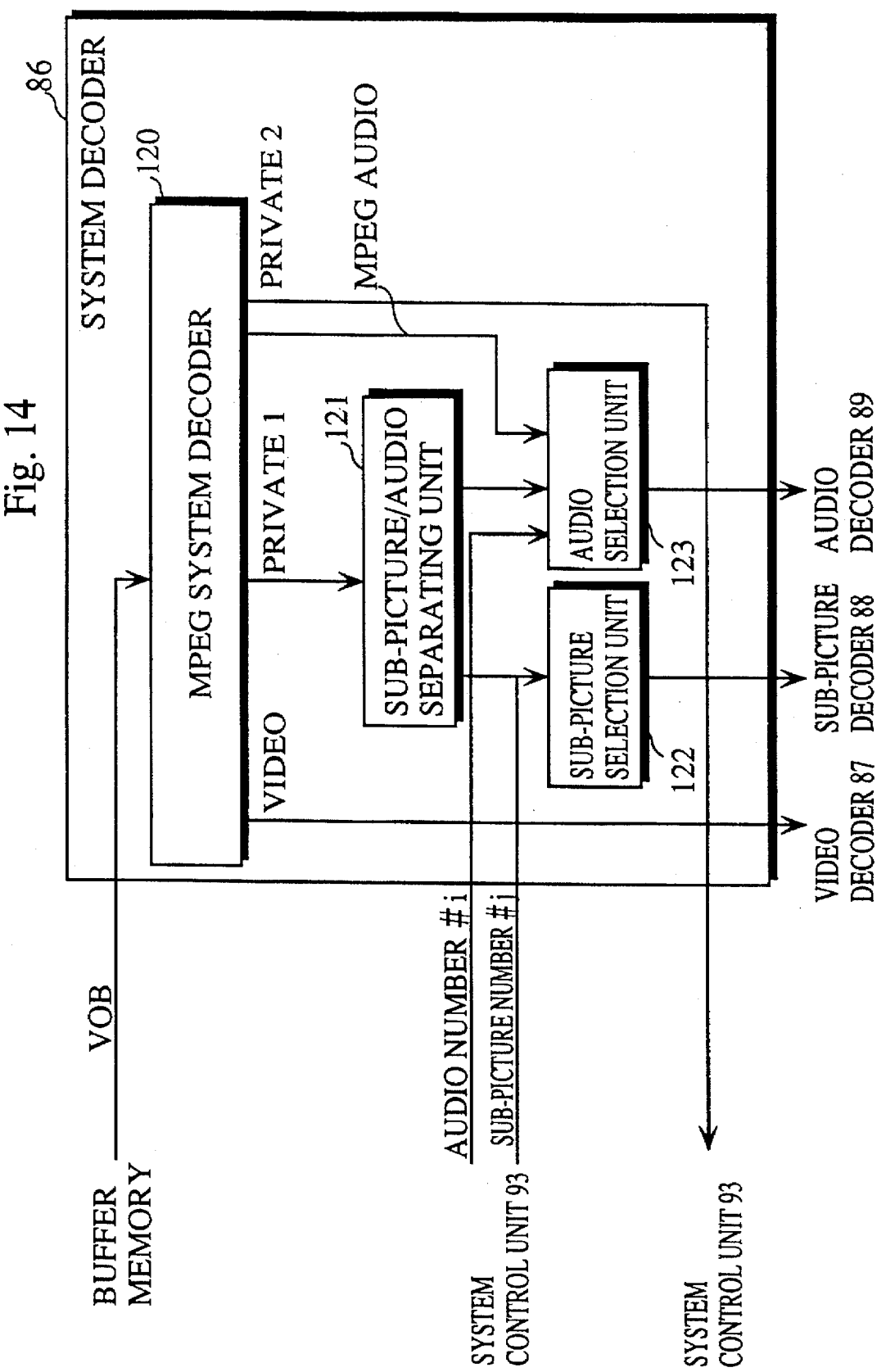
FIG. 14 is a block diagram showing the construction of the system decoder 86 shown in FIG. 13B.

FIG. 14 shows a block diagram for the construction of the system decoder 86 shown in FIG. 13B. As shown in this drawing, the system decoder 86 is made up of an MPEG decoder 120, a sub-picture/audio separator 121, sub-picture selection unit 122 and an audio selection unit 123.

The MPEG decoder 120 determines the kind of pack by referring to the stream ID in the pack header of each data pack included in the VOB transferred from the buffer memory and, depending on its determination result, outputs the packet data to the video decoder 87 for a video packet, to the sub-picture/audio separator 121 for private packet 1, to the system control unit 93 for private packet 2 and to the audio selection unit 123 for an MPEG audio packet.

The sub-picture/audio separator 121 determines the kind of packet by referring to the substream ID in the packet header of the private packet 2 inputted from the MPEG decoder 120 and, depending on its determination result, outputs the data to sub-picture selection unit 122 if it is sub-picture data or to the audio selection unit 123 if it is audio data.

The sub-picture selection unit 122 outputs to the sub-picture decoder 88 only the sub-picture data which has the number #j stored in the language register in the system control unit 93, out of all the sub-picture data sent from the sub-picture/audio separator 121. The remaining sub-picture data is discarded.

The audio selection unit 123 outputs to the audio decoder 89 only the audio data which has the number #i stored in the language register in the system control unit 93, out of the MPEG audio inputted from the MPEG decoder 120 and the audio data inputted from the sub-picture/audio separator 121. The remaining audio data is discarded.

Figure 15:
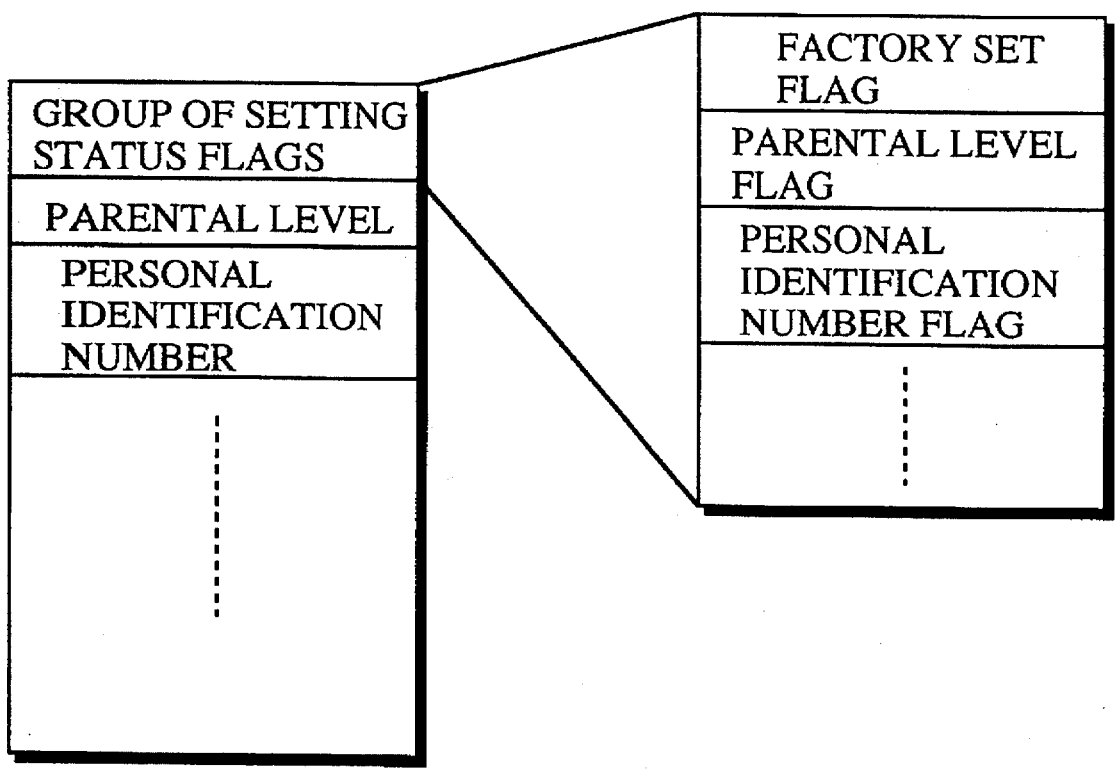
FIG. 15 shows an example of the data set in the nonvolatile memory 940 of FIG. 13B.

FIG. 15 shows an example of data indicated by the nonvolatile memory 940 in FIG. 13B. As shown in this figure, for the nonvolatile memory 940, a group of flags, made up of a factory set flag, a parental level flag and a personal identification number flag, and a region which stores the parental level and the personal identification number are assigned to predetermined addresses. Here, the content of these kinds of data is set by the user (especially parents) in the player setting menu.

The "factory set flag" shows the setting when the reproduction device was shipped from the factory, which is to say whether the parental lock has been released or whether the parental lock is operational.

The "parental lock flag" shows whether a parental level has been set.

The "parental level" is a character code string showing the name of the rating whose reproduction is permitted, such as "Adult", "R" or "General".

The "personal identification number flag" shows whether a personal identification number has been set.

The "personal identification number" is a number which is set by a user (especially parents) and is used when setting or changing the parental level.

Simplified Processing of the System Control Unit 93

Figure 16:
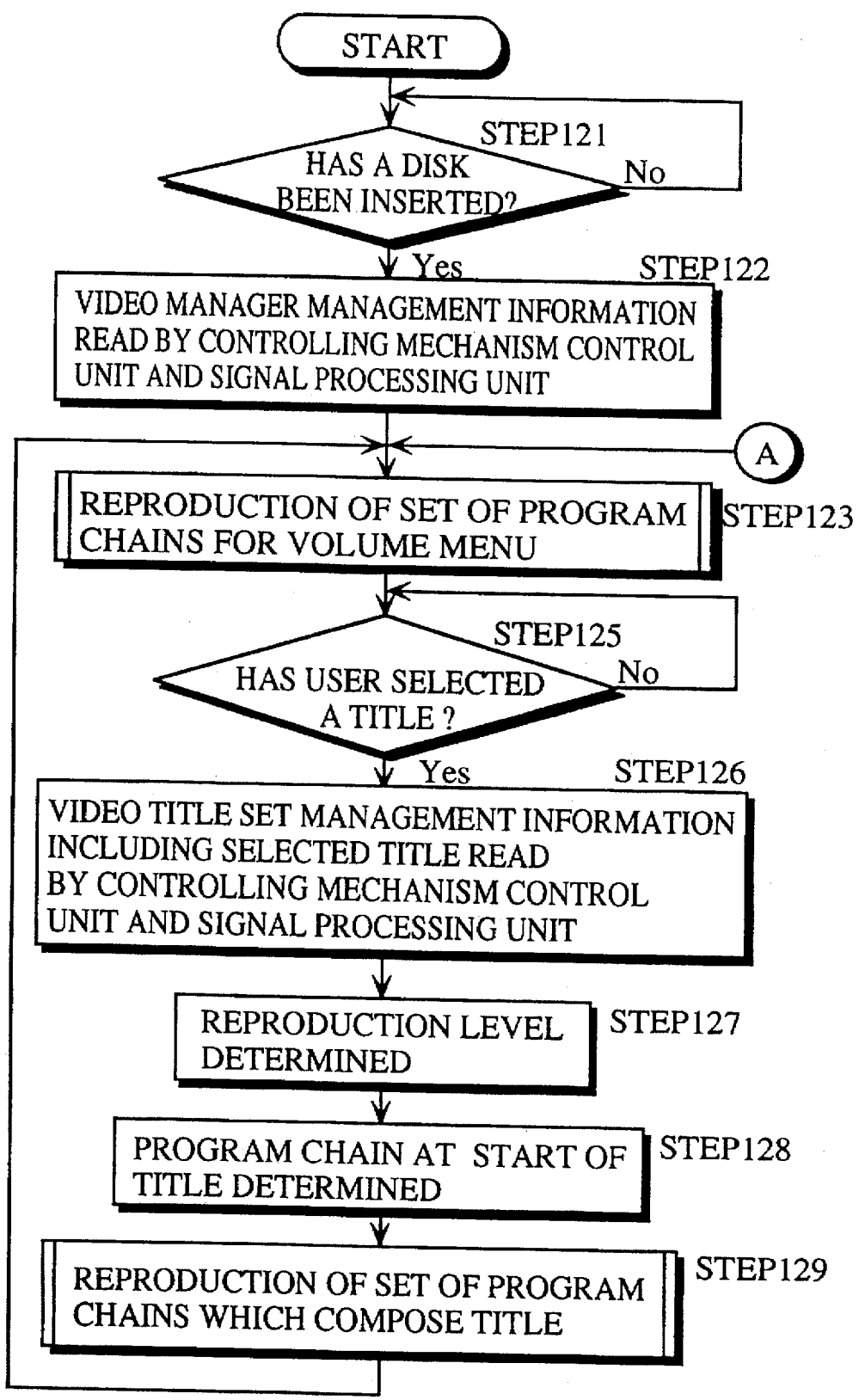
FIG. 16 shows a flowchart for the processing by the system control unit 93 of FIG. 13B.

FIG. 16 shows a flowchart for the processing content of the system control unit 93 shown in FIG. 13B.

First, on detecting that a disc is set in the reproduction device, the system control unit 93 controls the mechanism control unit 83 and the signal processing unit 84 and has disc rotation control performed until stabilized retrieval from the disc can be performed, at which point the optical pickup is moved and the parental information table shown in FIGS. 11, 12A and 12B is read from the lead-in area (steps 121, 122). Next, the system control unit 93 reads the volume menu management information in the video manager (step 123) and reproduces the PGC for the volume menu (step 124). This volume menu is a menu which (1) allows the user to select a title to be reproduced out of all the titles recorded on the optical disc, (2) allows the user to select the language for the soundtrack and (3) allows the user to select language for the subtitles.

Once the user has selected their desired title, the system control unit 93 refers to the title search pointer table to find the storage location of the selected title on the disc, before storing the video title set management information of the video title set for the selected title in an internal buffer (step 126). If at this point a language for the soundtrack and a language for the subtitles have been selected, the system control unit 93 makes an appropriate setting of the audio data number and the sub-picture data in the language register.

The system control unit 93 also sets the reproduction level of the selected title according to the following processes (127.1) through (127.7) (step 127).

(127.1) It reads the country ID in the country ID storage unit 935.

(127.2) It specifies the country rating information in the parental information table read in step 122 from the country ID.

(127.3) It reads the character string showing the parental level from the nonvolatile memory 940.

(127.4) It searches the character strings showing ratings in the country rating information using the character string for the parental level as the key.

(127.5) It specifies a rating level out of the country rating information as its search result.

(127.6) It reads the reproduction level of the selected title in the specified rating levels.

(127.7) It sets this reproduction level in the level register.

Following this, the system control unit 93 determines the PGC information at the start of the selected title from the PGC information table in the video title set management information stored in the internal buffer (step 128). Next, the system control unit 93 reproduces the starting PGC and all of the PGCs which compose the title and returns to step 124 on completing the reproduction (step 129). When, during the reproduction of the set of PGCs, several PGCs have been block converted, the system control unit 93 selects and reproduces a PGC in accordance with the level ID stored by the level register.

Reproduction Process of the System Control Unit 93

Figure 17:
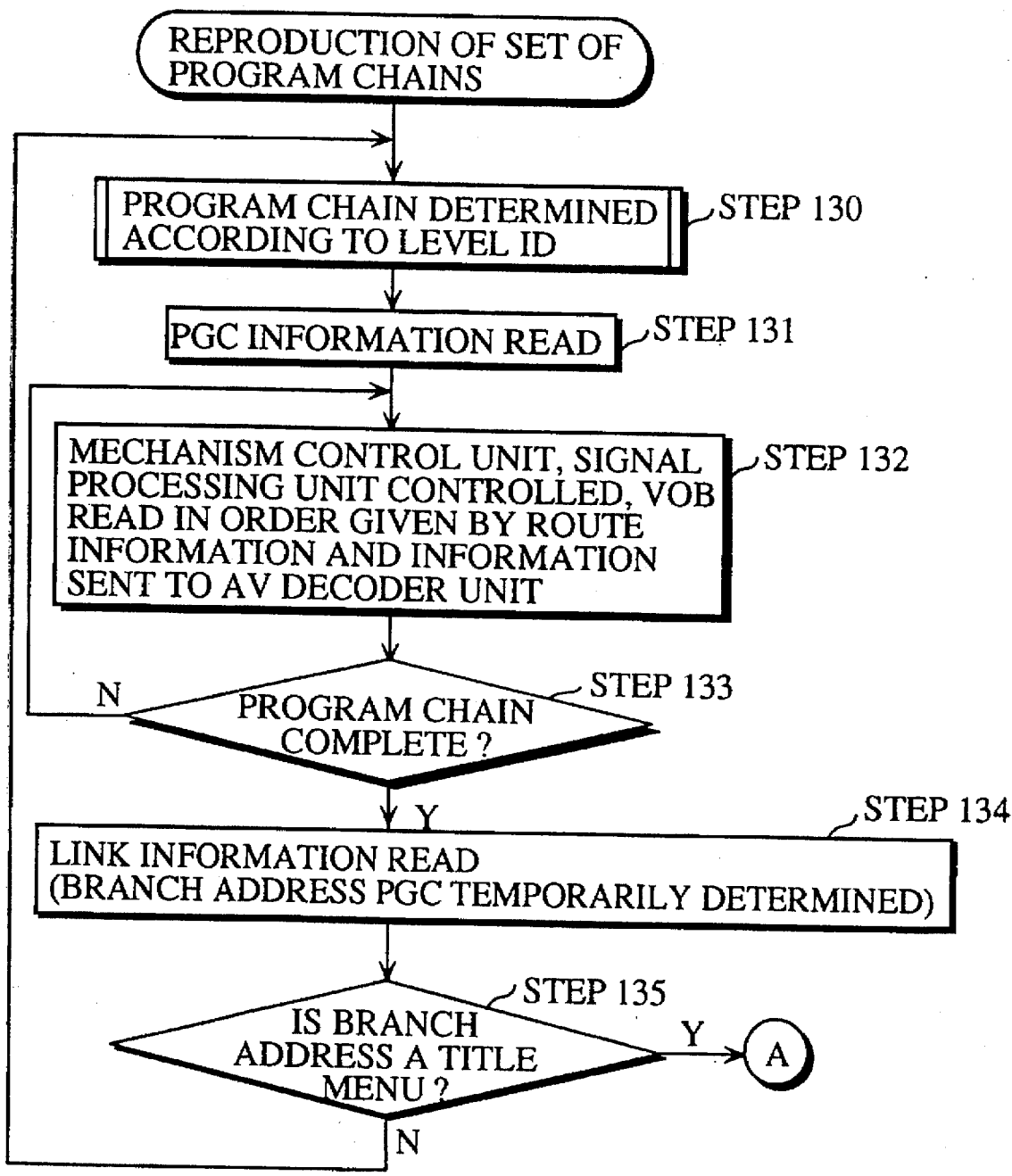
FIG. 17 shows a more detailed flowchart for reproduction processing of a group of PGCs by the system control unit 93 shown as step 129 in FIG. 17.

FIG. 17 shows a detailed flowchart for the reproduction process of a set of PGCs by system control unit 93 which was shown as step 129 in FIG. 16. This process includes the same processing as step 123 (reproduction of the PGC in for the volume menu) in FIG. 16.

In FIG. 17, the system control unit 93 first refers to the attribute table stored inside the reproduction device and then determines the PGC in accordance with the reproduction level stored in the level register (step 130), before retrieving the PGC information for the determined PGC (step 131) and, by controlling the mechanism control unit 83 and the signal processing unit 84, reading the VOB in order of the pointers stored in the route information (step 132). The retrieved VOBs are separated and reproduced by the AV decoder unit 85. At this point, the separated video is displayed on the display screen, with audio output also being commenced for the audio data which corresponds to the audio number specified by the language register and the video image being superimposed with the sub-picture image which corresponds to the sub-picture number specified by the language register.

After this, the system control unit 93 reproduces the next VOB in the order given by the route information and, when there is no VOB to be reproduced next (when the PGC is over) (step 133:yes), reads the link information and provisionally sets the next PGC to be reproduced (step 134). Here, if this branch address is the volume menu, the system control unit 93 returns to step 124 in FIG. 16 (step 135:no), while if this is not the case, the system control unit 93 returns to step 130 (step 135:yes).

Determination of Reproduction Level by the System Control Unit 93

Figure 18:
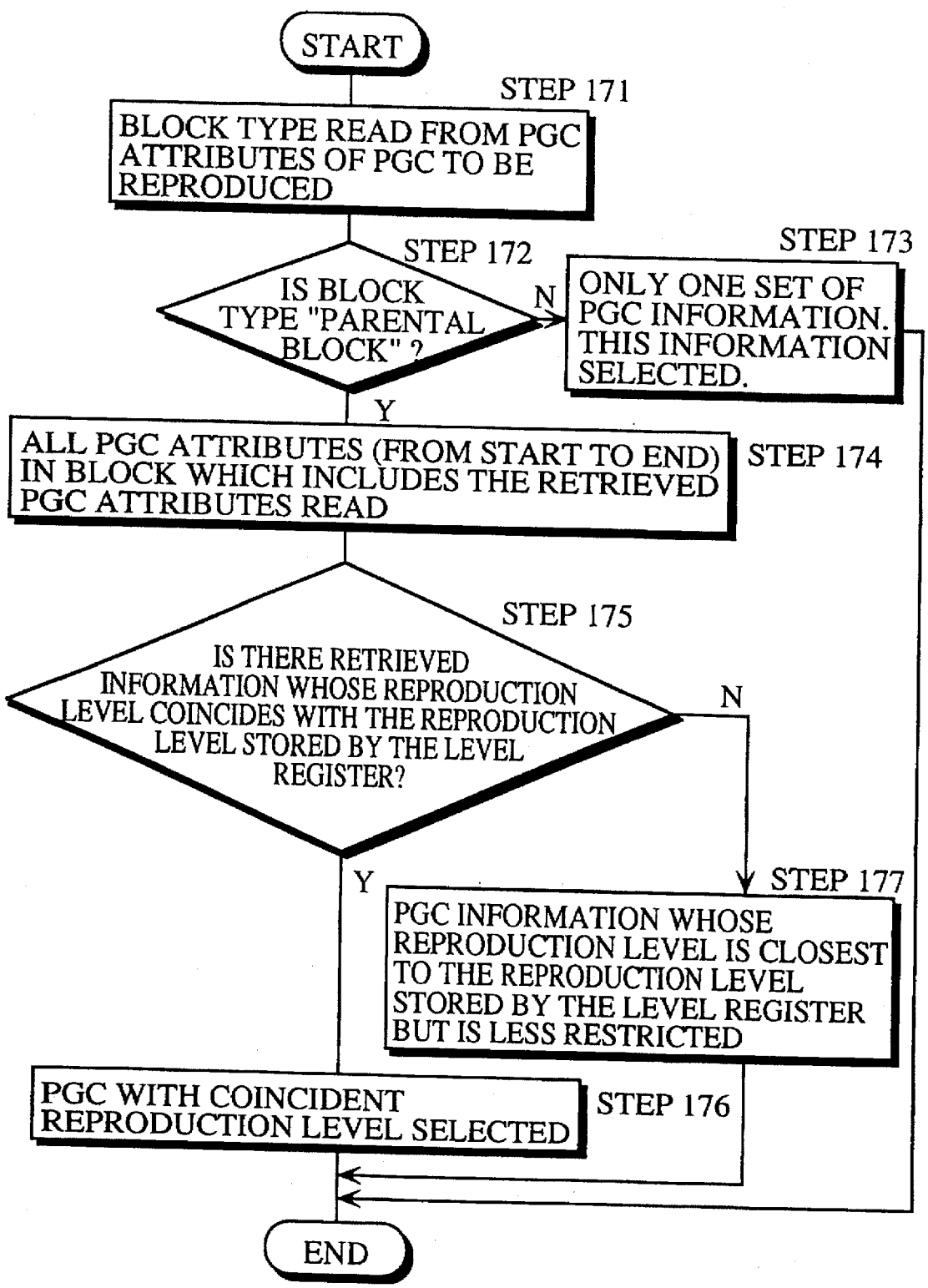
FIG. 18 shows a more detailed flowchart for determination processing of a PGC in accordance with the reproduction level by the system control unit 93 shown as step 130 in FIG. 17.

FIG. 18 is a detailed flowchart for the determination process of a PGC executed by the system control unit 93 in accordance with the reproduction level in the level register which was shown as step 130 in FIG. 17. In FIG. 18, the system control unit 93 reads the block type from the PGC attributes of the PGC to be reproduced given in the attribute table shown in FIG. 7 (step 171) and, if the block type is non-block, the PGC information corresponding to this PGC attribute is selected (Step 172, 173). If the block type is block, all of the PGC attributes included in the block having this PGC attribute (from the PGC attribute whose block mode is "start" to the PGC attribute whose block mode is "end") are retrieved (step 172, step 174).

When there is PGC information which has a reproduction level which matches the reproduction level in the level register of the reproduction levels in the retrieved block, the system control unit 93 selects this matching PGC information (steps 175, 176). However, when PGC information with a matching level is not present in a block, the system control unit 93 selects PGC information which has the next less restricted reproduction level after the reproduction level in the level register (steps 175, 177).

By making the above determination, the provisionally determined branch address PGC can be confirmed, so that the PGC information which has a reproduction level corresponding to the parental level stored in the nonvolatile memory 940 can be selected. Using the aforementioned link information, branches to PGCs which have been block converted can be performed by merely using any PGC in a block as a branch address, so that it is unnecessary to set a separate branch address for each reproduction level.

Operation Example

The following is an explanation of (1) the setting of the permitted reproduction level for the reproduction device by the user, (2) the changing of the parental level in the reproduction device/removal of the parental lock and (3) the reproduction of a title for the reproduction device of the embodiment of the present invention described above.

(1) Setting of the Permitted Reproduction Level for the Reproduction Device by the User The present explanation deals with the setting operation of the present reproduction device for ratings.

Figure 19A:
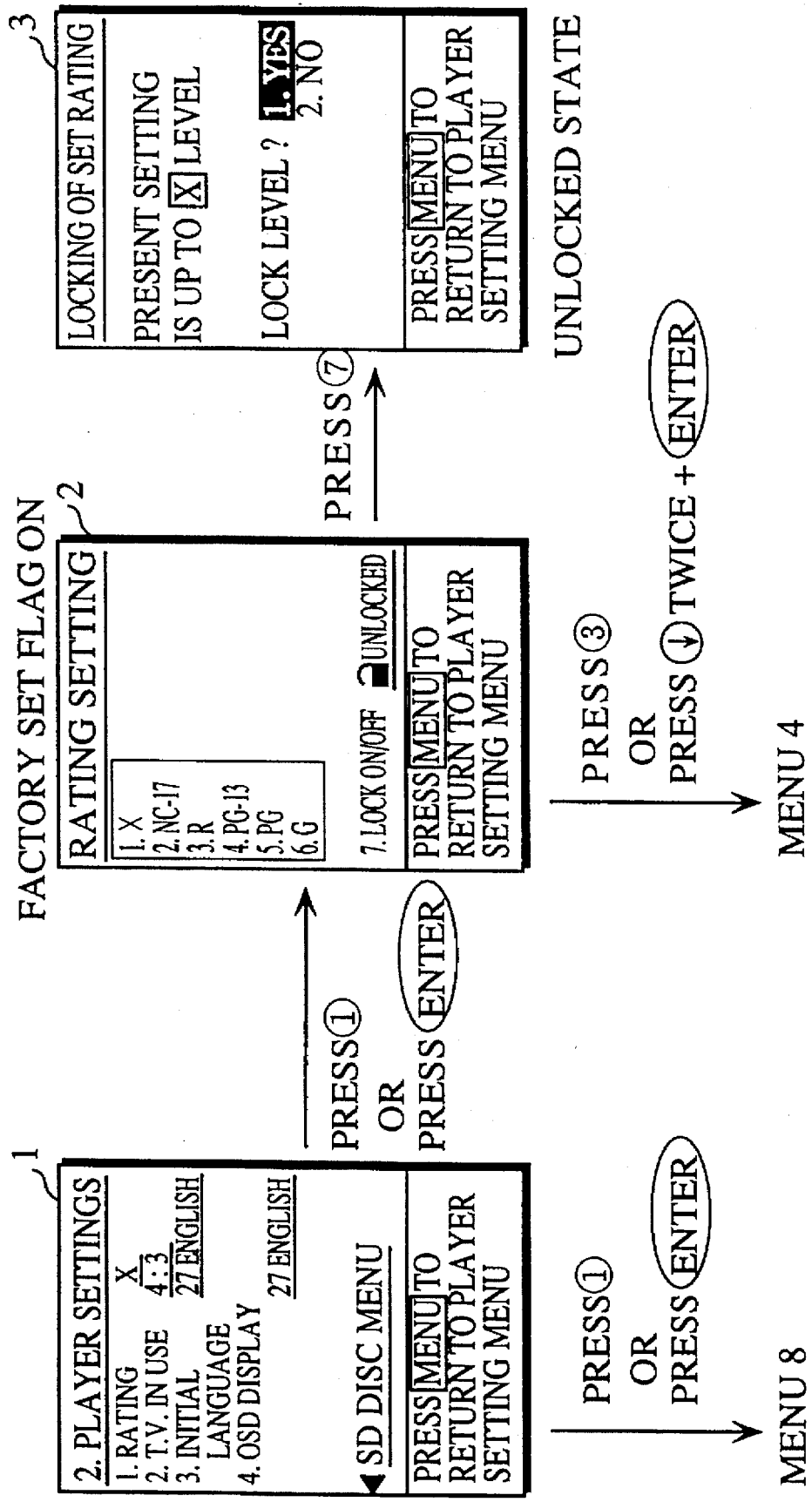
FIGS. 19A through 19C show the procedure for the setting of a rating When the country ID stored in the country ID storage unit 935 is for the USA.
Figure 19B:
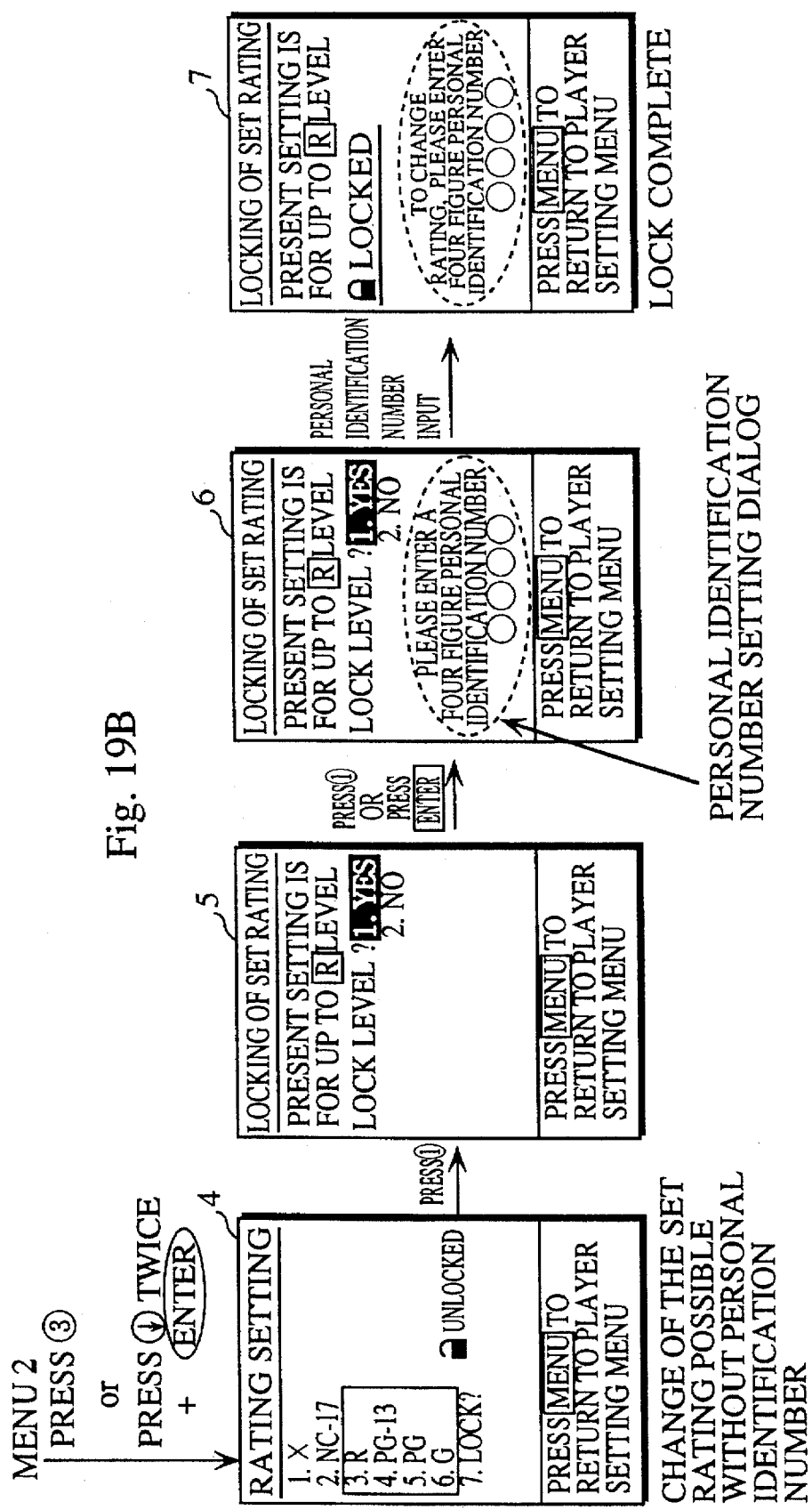
Figure 19C:
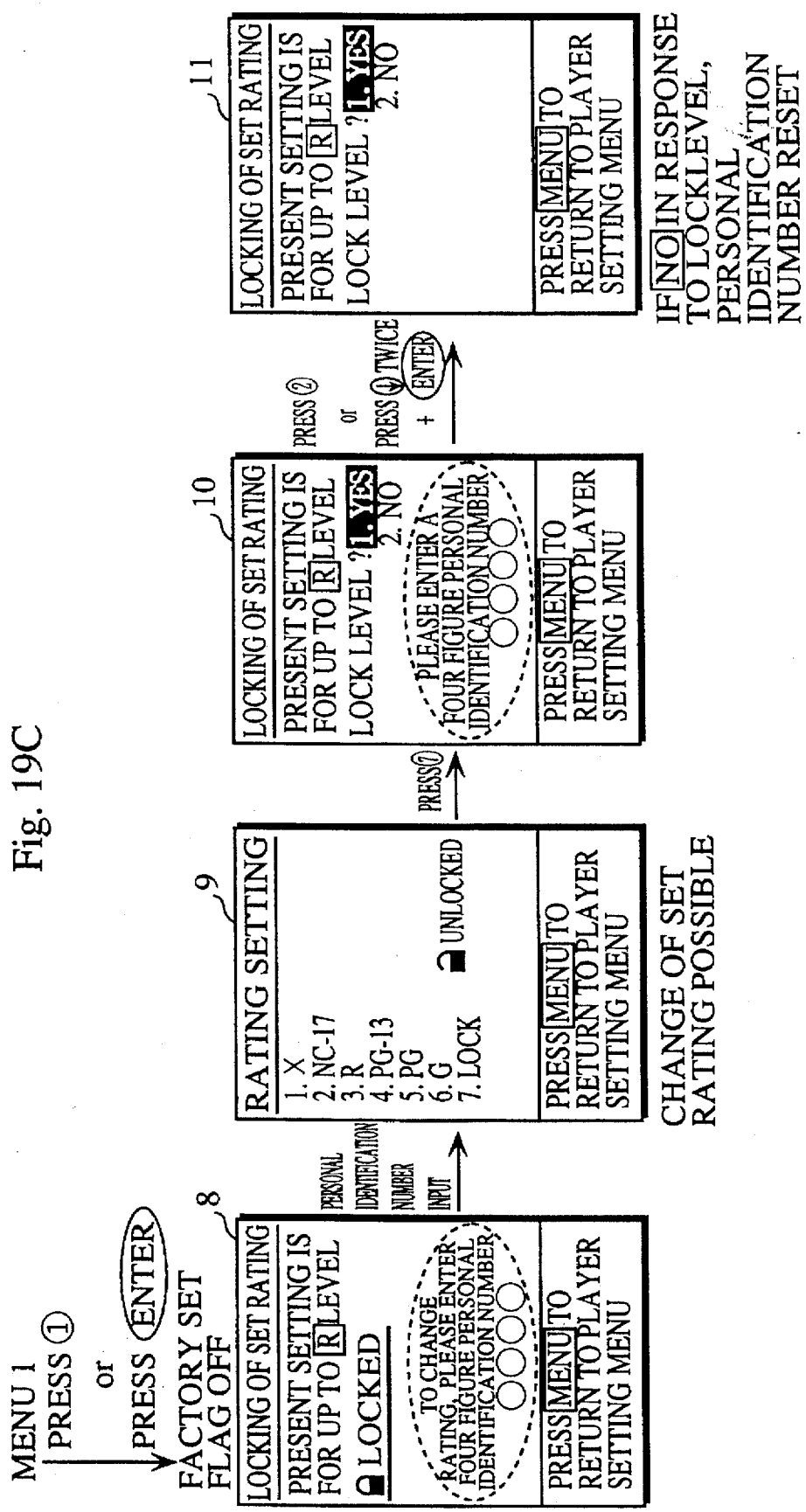

FIGS. 19A–19C show the procedure for rating setting when the country ID stored by country ID storage unit 935 is for the USA.

After the reproduction device is turned on, the system control unit 93 has the player setting menu 1 displayed by the OSD unit 933 based on the OSD information in the country information storage unit 930 and waits for an indication from the ten key on the remote controller 91. In addition to the rating setting, this player setting menu 1 is also used for the display setting of a TV, the setting of the language to be used and the like.

When "1" on the ten key has been pressed during the display of the player setting menu 1 and the factory set flag in the nonvolatile memory 940 is ON, the system control unit 93 has the rating setting menu 2 displayed and waits for a next input from the ten key on the remote controller 91. Here, FIGS. 19A and 19B assume that the USA is the country of use, so that the rating system used is that set by the Motion Picture Association of America.

When any of "1" to "6" on the ten key of the remote controller 91 are pressed during the reproduction of the rating setting menu 2, the frame showing the permitted reproduction level changes to the selected level. As one example, when "3" is pressed, the rating setting menu 4, such as that shown in FIG. 19B, is displayed showing that reproduction up to the level "R" is permitted. Here, such settings may also be performed using cursor keys and enter key instead of direct input with the ten key.

If the "7" key is pressed once the rating has been set, the display proceeds to the lock setting menu 5. Here, in order to terminate setting without using the lock, which is to say setting the device so as to allow the reproduction of all levels, the user can press "7" on the ten key during the reproduction of the rating setting menu 2 to advance to the lock setting menu 3, before returning to player setting menu 1 without setting the lock.

If the user presses the "1" key or the enter key during the reproduction of lock setting menu 5, the display advances to the personal identification number input menu 6 where the user can input a four-figure personal identification number using the ten key.

Once the user has inputted his/her personal identification number, the display advances to the lock completion menu 7 where the lock is confirmed and a return to player setting menu 1 is performed. At this point, the system control unit 93 sets the parental level flag and personal identification number flag at ON and the factory set flag at OFF (locked state) in the nonvolatile memory 940 (see FIGS. 13B, 15) and writes in the parental level indicated by menu 6 and the personal identification number.

(2) Changing of the Parental Level in the Reproduction Device/Removal of the Parental Lock The following is an explanation of a change or removal of the parental lock once it has been confirmed in the above procedure.

When the factory set flag is off during the reproduction of the player setting menu 1 and the "1" key on the ten key has been pressed, the display advances to the lock setting menu 8 (see FIG. 19C) which shows the parental level which may currently be reproduced and the and state of the lock. If the correct four-figure personal identification number is inputted during the display of this lock setting menu 8, the display advances to rating setting menu 9 where the rating can be set and changed in the same way as in rating setting menu 2. After changing the rating using the ten key, pressing "7" on the ten key makes the display advance to the lock setting menu 10 where pressing "1" sets the lock once again.

As a result, in addition to the parental lock level and the personal identification number being stored in the parental lock level and the personal identification number shown in FIG. 15, in the group of setting flags the factory set flag is set at OFF and the parental level flag and the personal identification number flag are set at ON.

Alternatively, if the "2" key or the "down" key and "enter" keys are pressed during the reproduction of the lock setting menu 10, the inputted personal identification number can be removed and the reproduction device returned to the same state as when it was shipped from the factory.

The above explanations (1) and (2) focus on the case when the USA is set in the country ID in the country ID storage unit 935, which is to say the case for a reproduction device for the American market, with the following points also being valid for other countries.

If, for example, the country ID is Japan, the selection items in the rating setting menus 2, 4 and 9 shown in FIGS. 19A, 19B and 19C are "Adult", "R" and "General". This is achieved by reading the rating system ("Adult", "R" and "General") for Japan from the rating information storage unit 932.

(3) Reproduction of a Title

The following is an explanation of the operation for reproducing a title when a disc is inserted into the reproduction device.

Once a disc has been set in the reproduction device, disc rotation control is performed until the balanced retrieval is possible, at which point the pickup is moved and the lead-in area shown in FIG. 4 is read. This lead-in area includes the parental information table shown in FIG. 11. This parental information table is read and is temporarily stored in the buffer memory in the system control unit 93.

Next, the video manager shown in FIG. 4 is read. The system control unit 93 refers to the video manager management information and the title search pointer management information in the video manager, reads the PGC information for displaying the volume menu and displays the volume menu (see step 124 in FIG. 16). An example of this volume menu is shown in FIG. 20.

As shown in FIG. 20, by displaying the volume menu, the system control unit 93 first has the title selection menu 12 displayed. In the illustrated example, the title groups are Movie X, Movie Y and Movie Z which are displayed as menu items, with these being composed of the PGCs shown in FIGS. 8A, 8B and 8C. This volume menu is also composed so as to allow the user to select the language for the audio soundtrack and the language for the subtitles using audio menu 13 and subtitle menu 14 according to necessity.

When the interrelation between on the one hand the audio data number and the sub-picture data number in a VOB and on the other hand the names of the designated languages is different for different titles, the audio menu 13 and subtitle menu 14 include specialized menus valid only for a particular title. When audio and subtitles are selected using such menus, the appropriate audio data number and sub-picture data number are then set in the language register in the system control unit 93.

Here, the following explanation assumes that "USA" is set in the country ID storage unit 935 of the reproduction device and the parental level "PC-13" is set in the nonvolatile memory 940. In this state, the user selects Movie Y (Title group 2 shown in FIG. 8B) in the title selection menu. Here, the following operation is performed in accordance with the flow shown in FIG. 16.

The system control unit 93 determines the reproduction level for parental level "PG-13" from the rating information (see FIG. 12B) for the USA in the parental information table (see FIG. 11) and sets the level register. This reproduction level is set at L6 from FIG. 12B. Next, the system control unit 93 determines the starting PGC for Movie Y (title group 2) and, in accordance with the flow shown in FIG. 17, reproduces the PGC group which compose Movie Y at reproduction level L6. As a result, the "PG-13" version of Movie Y, which is to say PGC#20→PGC#24→PGC#28 shown in FIG. 8B are reproduced. After reproduction is completed, the volume menu is displayed once again.

Next, the explanation assumes that "USA" is set in the country ID storage unit 935 of the reproduction device and the parental level "PG" is set in the nonvolatile memory 940. In this state, the user selects Movie Y (Title group 2 which is shown in FIG. 8B) in the title selection menu. As a result, since the reproduction level corresponding to "PG" is determined at L7 from the parental information table in FIG. 12B, PGC#20→PGC#25→PGC#28 shown in FIG. 8B are reproduced.

For the above example operations, the user selects their desired language in the audio data menu and subtitle data menu in the volume menu, but this need not be the case. As one example, when the linked relations of all of the different languages with the audio data numbers and subtitle data numbers are the same for every title, the user may have their desired language set in the language register using a language processing setting item in the player setting menu 1 shown in FIG. 19.

By means of the multimedia optical disc of the present invention, it is possible for disc manufacturers to market a same disc worldwide, which leads to a great reduction in the manufacturing and handling costs of discs. As a result, manufacturers are able to export to an even wider world market.

From the viewpoint of a user, there are the benefits of being able to purchase discs at a lower price, while users in smaller markets will be able to enjoy a greater variety of titles which appear on the market quicker than now. Furthermore, parents can have peace of mind when buying a player and disc software, since the whole family is able to enjoy such titles. Here, since specified users (such as parents) still have full control over reproduction, users retain the right to watch whichever title they wish.

It should be noted here that since the disc is adapted to world use, a parental information table needs to be prepared for use in each country, but, supposing a given country is not registered, the following procedure can be used.

When country rating information corresponding to a country ID in the country ID storage unit 935 is not registered in the parental information table shown in FIG. 11, the system control unit 93 may reproduce the information corresponding to the parental information for country ID#99 ("Other countries").

Also, when country rating information corresponding to country ID#99 (Other countries) is not registered, the system control unit 93 may refuse reproduction or alternatively reproduce the title at the highest available reproduction level which is unlikely to offend any potential viewers. For countries which do not have an established system of ratings, it is also possible for the manufacturers of the present disc to prepare different versions of a title according to their own guidelines. This kind of reproduction may also be used for countries which, due to their limited market for reproduction devices, do not have their country ID registered in the country information ROM. Here, titles which are not movies may also be reproduced or not depending on the designated country.

It should also be noted that in the above embodiment, the country ID storage unit 935 was composed of ROM whose content is set before shipping from the factory, but it is also possible for a specialized disc to be set by a user or dealer after shipping to store the necessary information in the non-volatile memory.

The above embodiment also describes the use of a personal identification number to limit the users who may change the permitted rating level for the reproduction device, although provided some other specialized operation is used, the present invention need not be limited to such. As examples, (1) a user may instead insert a special optical disc into the player, or (2) insert a special magnetic card. In case (1), the special optical disc comes provided with the reproduction device and is then administered by parents who use it to change the settings of the reproduction device according to necessity. In this case, the system control unit 93 has a special mechanism for detecting such an optical disc (which, for example, stores a file which shows that setting rating levels is possible). In case (2), the reproduction device includes a magnetic card reader and a mechanism for detecting a special data input.

Also, the present embodiment describes the case where ratings are decided for each country separately, although regions (such as North America) or groups of countries may be used.

The present embodiment also relates to the present ratings systems used in the film industry as an example, so that the present invention can be adapted should some other kind of regulatory system for multimedia come into force in the future.

The above embodiment describes the case where the level ID for selective reproduction control is set in each VOB unit itself, although this need not be the case, so that it can alternatively be set in the PGC information table (attribute table) for controlling the reproduction order of VOBs. By doing so, it is possible for a plurality of block-converted PGCs to commonly contain VOBs on different levels. For the title developer, this means that it is only necessary to separately prepare VOBs for sections of video where different images are necessary on different levels.

In the above embodiment, the desirable arrangement order of PGC attributes in the attribute table is such that the levels in the level ID are in ascending order of strictness of video content. As one example, for the example of FIG. 7, the block-converted PGCs #2, #3 and #4 are arranged in ascending order of the strictness of the levels of their level IDs (1, 2, 3) which correspond to the order "start, middle, end" in the block modes. By using this kind of arrangement order, it becomes possible to make the actual setting of a PGC (see the process in FIG. 18) at high speed, in accordance with the registered level and the temporarily determined PGC.

As one example, suppose that in the determination process, the registered level is 3 and level of the temporarily determined PGC is 2. Here, if the block mode is start or middle, this means there is definitely a valid PGC in the lower entry of the attribute table. In this case, in step 174 in FIG. 17, the system control unit 93 does not need to read all of the PGC attributes in the block in the attribute table and so may instead only read the lower entry.

Furthermore, the aforementioned arrangement order is also desirable in order to prevent erroneous operation which does not observe the registered level, even when the PGCs are displayed totally at random. As one example, when a non-intended PGC is specified, which can be when a special function is prepared so that PGC numbers can be directly specified by the user making a remote control operation or when an erroneous operation occurs due to the reproduction device being knocked or to a disc retrieval error, if, in the determination process, the block mode of the PGC attribute in question is "end", there is no need to perform a search and it can be immediately determined that there is no PGC which can be reproduced at the registered level.

Also, for the attribute table shown in FIG. 7, PGC attributes whose block type is "non-block" may be registered so that their all of the reproducible levels are set as their level ID. In the illustrated case, the level ID for PGC#1 and PGC#7 in FIG. 7 becomes levels 1, 2 and 3, and the level ID for PGC#5 becomes levels 1 and 2. Here, since there will always be PGC information with matching level ID in step 175 in the determination process of the system control unit 93 shown in FIG. 17, the processing in step 177 can be omitted.

The above description focussed on an example where the level IDs were self-imposed ratings set according to the extent to which sex scenes, violent scenes and the like are present in the video content, although other kinds of ratings may be used. As examples, a no-cut version, a cinema version and a TV version may be used for a movie application while beginner, low level, intermediate and advanced may be set for a game application. Also, since levels such as beginner, low level, intermediate and advanced do not require a parental lock, the nonvolatile memory 940 may be used as a special register inside the reproduction device for a temporary setting of reproduction level. In such a case, this level can be set according to a user indication at the beginning of the application.

Also, the present embodiment describes a case when a plurality of PGCs have been block converted, although when only one version of a movie title is recorded on an optical disc, one movie may be recorded on the optical disc as one PGC. In this case, when only one version of a film which would be rated "adult" in Japan or "X" in the USA, the level ID of this PGC can be set at L2, with only the appropriate rating level for the country or region, such as "Adult" for Japan or "X" for the USA, and the level ID (in this case, L2) being set in the parental information table. By doing so, the movie title can only be viewed when the parental level is set at "Adult" for Japan or "X" for the USA, or when the parental lock has been removed.

Also, the present embodiment describes the case where management information is arranged into GOPs which are the unit for decompression of video, although if a different compression technique is used, the management information may be stored in accordance with the units for that compression technique.

It should also be noted that in the present embodiment, the case where the video information is stored using digital video data under MPEG2 standard was explained, although the present invention should not be limited to this format, so that any multimedia data format where video, audio and sub-pictures can be supplied together may be used, such as digital video under MPEG1 or digital video according to a conversion algorithm aside from DCT (Discrete Cosine Transform) as used under MPEG format.

Also, the present embodiment describes the case where a DVD is used as the optical disc, although any storage medium which can be used for storing a large amount of digital video may be used.

The level ID registering operation shown in FIGS. 19A through 19C was described as using a personal identification number in the level setting menu which is displayed using the OSD information in the OSD information storage unit 95, although if only a specified user is allowed to set this function, these menus are no longer necessary. As an example, if parents have a special optical disc which stores a level setting menu, the reproduction level may be changed only when such disc is inserted in the reproduction device.

Finally, the present invention described the case where a DVD is used as the read-only disc for the present embodiment, although there is no difference to the effect of the invention if a rewritable disc is used.

Manufacturing Process of the Optical Disc

Figure 21:
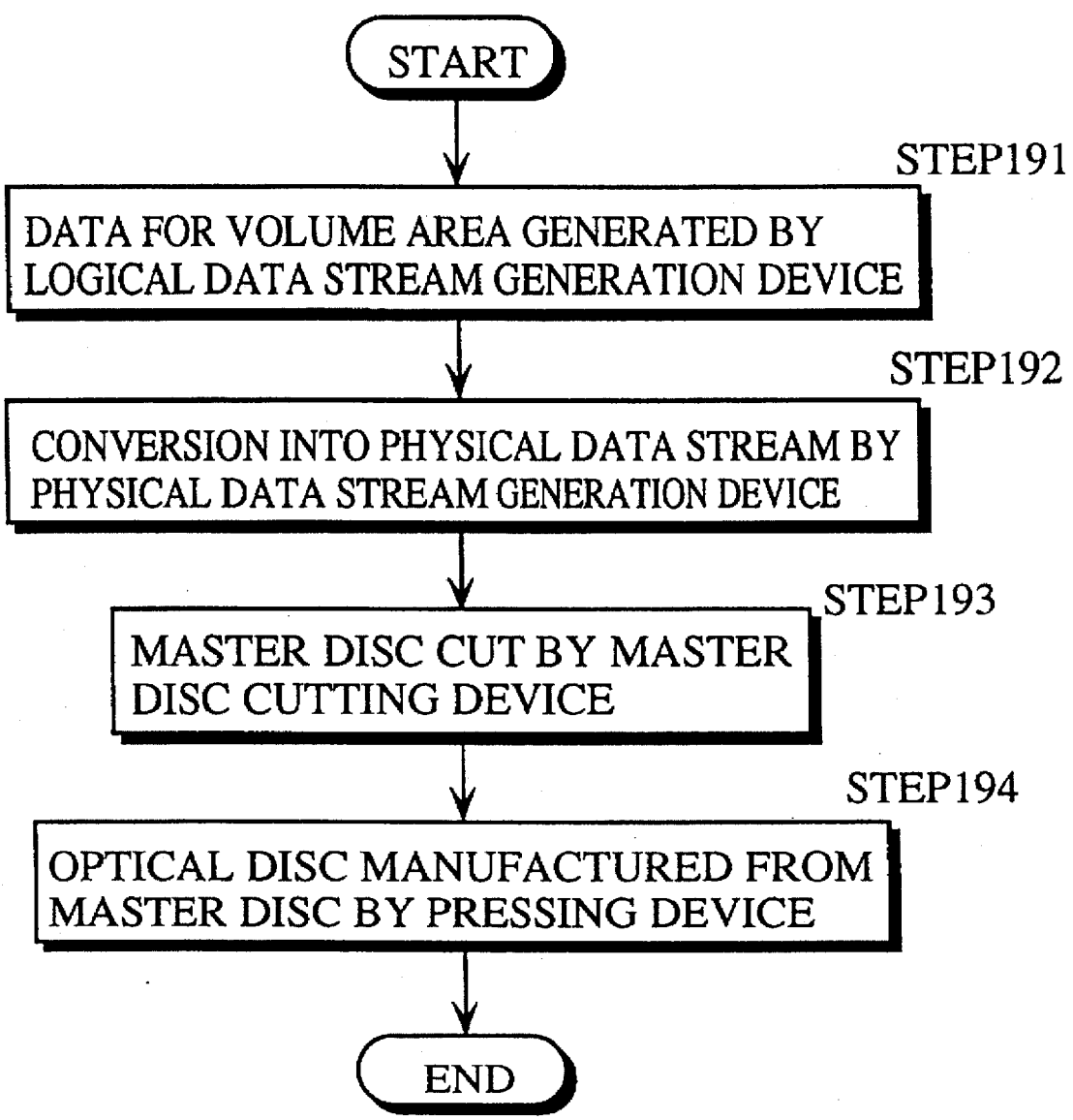
FIG. 21 shows a flowchart for the manufacturing process of the optical disc to which the present invention relates.

FIG. 21 shows a flowchart for the manufacturing process of the optical disc in the present embodiment.

First, the data in the volume area shown in FIG. 4 is generated by a logical data stream generation device (step 191). This logical data stream generation device uses multimedia data editing software on a personal computer or workstation and can generate volume data of the data construction shown in FIG. 4. This volume data is recorded onto a transfer medium, such as magnetic tape, and is then converted into a physical data stream by a physical data stream generation device (step 192). This physical data stream is processed using an ECC (error checking code) after data for the lead-in area and data for the lead-out area and the like have been added to the volume data. A master disc cutting process then cuts a master disc for the optical discs using this physical data stream (step 193). Finally, optical discs are manufactured from the master disc by a pressing device (step 194).

The aforementioned manufacturing process can be achieved, with the exception of the part about the logical data stream generation device using the data construction of the present invention, by the same manufacturing equipment as conventional CDs. This is described in "Compact Disc Reader" by Heitaro Nakajima and Hiroshi Ogawa, Ohm Books and in "Optical Disc Systems" by the Applied Physics Society/Optics Discussion group, Asakura Publishing.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A multimedia disc, comprising:
    a video data storage region for storing a plurality of video data sequences;
    a management information storage region which stores management information, the management information comprising group information that shows which video data sequences have been grouped together to compose a group from which only one of the composing video data sequences is reproduced, a level ID for each video data sequence in a same group and a set of link information for each video data sequence which indicates a next video data sequence to be reproduced after completion of reproduction of a video data sequence in question; and
    a level map storage region for storing a separate table for each country/region, wherein each table for a country/region includes information which maps each sort level in a sorting system for the country/region to a level ID.

2. The multimedia optical disc of claim 1,
    wherein the table for a country/region stores a country/region code for identifying the country/region, sort levels in the sorting system in the corresponding country/region and a level ID which corresponds to each sort level, and
    wherein a sorting system in a country/region is made up a plurality of sort levels which show viewing regulations which correspond to an extent to which violent scenes and sex scenes are included in video data and each sort level is expressed by a character string which expresses an appropriate name within the sorting system in question.

3. The multimedia optical disc of claim 2, further including a track which has the sectors arranged in a spiral, wherein the management information storage region and the level map storage region are assigned to track positions which are read before the video data storage region by a reproduction device.

4. The multimedia optical disc of claim 3, wherein each video data sequence is made up of a plurality of objects, and wherein chains, each which indicates a combination of objects which forms one of the video data sequences, are stored in the management information storage region.

5. The multimedia optical disc of claim 4, wherein the video data storage region is made up of a plurality of object storage regions, each of the object storage regions being recorded in consecutive sectors of the multimedia disc.

6. The multimedia optical disc of claim 5, wherein each of the objects is made up of a plurality of object units, wherein each of the object units is made up of one video segment and a plurality of sets of audio data, and wherein the plurality of object units are arranged in order of reproduction in the object storage regions.

7. The multimedia optical disc of claim 2, wherein each video data sequence includes at least one of a plurality of sets of audio data and a plurality of sets of sub-picture data which are interleaved with a corresponding video segment of a given reproduction period, wherein a content of each set of audio data corresponds to the video segment of the given reproduction period and a content of each set of sub-picture data corresponds to the video segment of the given reproduction period.

8. The multimedia optical disc of claim 7, wherein each video segment is made up of images in a movie title and the plurality of sets of audio data are composed of soundtracks dubbed in different languages.

9. The multimedia optical disc of claim 8, further including a track which has the sectors arranged in a spiral, wherein the management information storage region and the level map storage region are assigned to track positions which are read before the video data storage region by a reproduction device.

10. The multimedia optical disc of claim 9,
    wherein each video data sequence is made up of a plurality of objects, and wherein chains, each which indicates a combination of objects which forms one of the video data sequences, are stored in the management information storage region,
    wherein the video data storage region is made up of a plurality of object storage regions, each of the object storage regions being recorded in consecutive sectors of the multimedia disc, and
    wherein each of the objects is made up of a plurality of object units, wherein each of the object units is made up of one video segment and a plurality of sets of audio data, and wherein the plurality of object units are arranged in order of reproduction in the object storage regions.

11. The multimedia optical disc of claim 7, wherein each video segment is made up of images in a movie title and the plurality of sets of sub-picture data are composed of subtitles in different languages.

12. The multimedia optical disc of claim 11, further including a track which has the sectors arranged in a spiral, wherein the management information storage region and the level map storage region are assigned to track positions which are read before the video data storage region by a reproduction device.

13. The multimedia optical disc of claim 12,
wherein each video data sequence is made up of a plurality of objects, and wherein chains, each which indicates a combination of objects which forms one of the video data sequences, are stored in the management information storage region,
wherein the video data storage region is made up of a plurality of object storage regions, each of the object storage regions being recorded in consecutive sectors of the multimedia disc, and
wherein each of the objects is made up of a plurality of object units, wherein each of the object units is made up of one video segment and a plurality of sets of audio data, and wherein the plurality of object units are arranged in order of reproduction in the object storage regions.

14. A multimedia optical disc, comprising:
a video data storage region for storing a plurality of video data sequences, wherein each video data sequence is made up of at least one object, wherein each object in a video data sequence includes a video segment of a reproduction period with which a plurality of sets of audio data to be reproduced with the video segment are interleaved;
a management information storage region which stores management information and chains,
the management information comprising group information which shows which video data sequences have been grouped together to compose a group from which only one of the composing video data sequences is reproduced, a level ID for each video data sequence in a same group and a set of link information for each video data sequence which indicates a next video data sequence to be reproduced after completion of reproduction of a video data sequence in question, and
each of the chains expressing a reproduction order of objects which compose each video data sequence; and
a mapping information storage region for storing a separate table for each country/region, wherein each table for a country/region includes information which maps each sort level in a sorting system for the country/region to a level ID of a movie title,
wherein each movie title is made up of a series of video data sequences which are linked by sets of link information and wherein for each series of video data sequences, only a video data sequence whose level ID corresponds to the sort level is selectively reproduced out of video data sequences which have been grouped.

15. The multimedia optical disc of claim 14, wherein each of the plurality of sets of audio data is for a different language.

16. The multimedia optical disc of claim 15,
wherein the table for a country/region stores a country/region code for identifying the country/region, sort levels in the sorting system in the corresponding country/region and a level ID for each movie title which corresponds to each sort level, and
wherein a sorting system in a country/region is made up a plurality of sort levels which show viewing regulations which correspond to an extent to which violent scenes and sex scenes are included in video data and each sort level is expressed by a character string which expresses an appropriate name within the sorting system in question.

17. The multimedia optical disc of claim 16, wherein the group information includes first information showing whether a video data sequence belongs to a group and second information which shows to which group a grouped video data sequence belongs.

18. The multimedia optical disc of claim 17, wherein an identifier used for a chain is an identification number and identification numbers of chains belonging to a same group are arranged into a consecutive numerical order.

19. The multimedia optical disc of claim 18, wherein the second information includes information which is attached to a lowest value out of identification numbers of chains in a same group to show a start of the group and information which is attached to a highest value out of identification numbers of chains in a same group to show an end of the group.

20. The multimedia optical disc of claim 19, wherein each of the objects is made up of a plurality of object units, wherein each of the object units is made up of one video segment and a plurality of sets of audio data, and wherein the plurality of object units are arranged in order of reproduction in the object storage regions.

21. A multimedia optical disc which includes:
a data region which stores a plurality of objects which in turn include a video segment, a set of audio data and a set of sub-picture data; and
an index region which stores a reproduction order for the objects,
wherein the data region is made up of a plurality of small regions with objects being stored across a plurality of consecutive small regions,
wherein each small region includes:
a first sub-region for storing a video segment of a unit reproduction time;
a second sub-region for storing a plurality of sets of audio data which are to be reproduced together with the video segment in the first sub-region, wherein each set of audio data is in a different language; and
a third sub-region for storing a plurality of sets of sub-picture data which are to be reproduced together with the video segment in the first sub-region, wherein each set of sub-picture data displays subtitles in a different language,
and wherein each index region includes:
a first index region for storing a plurality of sets of chain information and sets of link information, wherein each set of chain information expresses a reproduction order of a list of objects to be reproduced (hereinafter called a "chain") and each set of link information indicates, for an arbitrary chain, a chain to be reproduced after the arbitrary chain;
a second index region for storing group information for indicating which chains are grouped together into a same group out of which only one chain is reproduced, as well as a plurality of level IDs, each of which is assigned exclusively to only one chain in a same group; and a third index region for storing separate table for each country/region, wherein each table for a country/region includes information which maps each sort level in a sorting system for the country/region to a level ID of each movie title, wherein each movie title is made up of a series of video data sequences which are linked by sets of link information and wherein for each series of video data sequences, only a video data sequence whose level ID corresponds to the sort level is selectively reproduced, out of video data sequences which have been grouped.

22. A multimedia optical disc which comprises:

a video data storage region for storing one video data sequence;

a management information storage region which stores management information, the management information comprising a level ID for the video data sequence; and a level map storage region for storing a separate table for each country/region, wherein each table for a country/region includes information which maps each sort level in a sorting system for the country/region to the level ID.

23. A reproduction device for a multimedia optical disc which includes: a video data storage region for storing a plurality of video data sequences; a management information storage region which stores management information, the management information comprising group information that shows which video data sequences have been grouped together to compose a group from which only one of the composing video data sequences is reproduced, a level ID for each video data sequence in a same group and a set of link information for each video data sequence which indicates a next video data sequence to be reproduced after completion of reproduction of a video data sequence in question; and a level map storage region for storing a separate table for each country/region, wherein each table for a country/region includes information which maps each sort level in a sorting system for the country/region to a level ID, the reproduction device comprising:

region code storage means for storing a region code showing a country/region;

level registration means for registering one of the sort levels for the sorting system used in the region indicated by the region code, in accordance with a user indication;

reading means for reading management information, mapping information and video data sequences from the optical disc;

table specification means for specifying a table for the country/region corresponding to the region code stored by the region code storage means;

reproduction level setting means for setting a level ID which corresponds to the sort level registered in the level registration means as a reproduction level by referring to the specified table of the country/region;

reading control means for determining a video data sequence corresponding to the set reproduction level in accordance with the group information and controlling the reading means to read the determined video data sequence; and reproduction means for reproducing every video data sequence read by the reading means.

24. The reproduction device of claim 23, wherein, when a next video data sequence to be reproduced is part of a group, a present set of link information indicates any video data sequence in the same group, and wherein the reading control means includes:

provisional setting means for provisionally setting a video data sequence indicated by the link information of a video data sequence presently being reproduced as a next video data sequence to be reproduced;

actual setting means for referring to the group information, for determining whether there is any other video data sequence which is grouped with the provisionally set video data sequence to allow selective reproduction, for actually setting the provisionally set video data sequence if no other video data sequence has been determined and for actually setting a video data sequence of the same group which corresponds to the reproduction level set by the reproduction level setting means if another video data sequence has been determined; and indication instruction means for indicating to the reading control means to have the actually set video data sequence reproduced.

25. The reproduction device of claim 24, wherein the actual setting means includes:

a comparison unit for comparing the reproduction level set by the reproduction level setting means with a level ID of each video data sequence which belongs to a same group as the provisionally set video data sequence;

a first determining unit for actually setting, when the comparison means finds that there is a video data sequence with a level ID which corresponds to the reproduction level, the video data sequence with the corresponding level ID; and a second determining unit for actually setting, when the comparison means finds that there is no video data sequence with a level ID which corresponds to the reproduction level, a video data sequence with a level ID which is close to the reproduction level but which represents a less restricted video content.

26. The reproduction device of claim 25, further comprising:

indication means for indicating a set of audio data according to a user operation;

video reproduction means for reproducing a video segment in a video data sequence;

audio selection means for selecting the indicated set of audio data from the plurality of sets of audio data which are to be reproduced with the video segment; and audio reproduction means for reproducing the selected set of audio data.

27. The reproduction device of claim 26, wherein a plurality of sets of sub-picture data which are to be reproduced together with video are interleaved in each video data sequence, wherein the indication means also indicates a set of sub-picture data and wherein the reproduction device further includes:

sub-picture selection means for selecting one set of sub-picture data which corresponds to an indicated language out of a plurality of sets of sub-picture data to be reproduced with a video segment; and sub-picture reproduction means for reproducing the selected set of sub-picture data.

28. The reproduction device of claim 23, further comprising:

indication means for indicating a set of audio data according to a user operation;

video reproduction means for reproducing a video segment in a video data sequence;

audio selection means for selecting the indicated set of audio data from the plurality of sets of audio data which are to be reproduced with the video segment; and audio reproduction means for reproducing the selected set of audio data.

29. The reproduction device of claim 28, wherein a plurality of sets of sub-picture data which are to be reproduced together with video are interleaved in each video data sequence, wherein the indication means also indicates a set of sub-picture data and wherein the reproduction device further includes:

sub-picture selection means for selecting one set of sub-picture data which corresponds to an indicated language out of a plurality of sets of sub-picture data to be reproduced with a video segment; and sub-picture reproduction means for reproducing the selected set of sub-picture data.

30. The reproduction device of claim 23, wherein the level registration means registers a sort level and a personal identification number and wherein the reproduction device further includes:

input means for inputting a personal identification number in accordance with a user operation;

coincidence judgement means for judging whether the inputted personal identification number coincides with the personal identification number registered in the level registration means; and change permission determination means for determining that the registered sort level can be changed by the user when the coincidence judgement means judges that there is coincidence.

31. A reproduction device for a multimedia optical disc which includes:

a video data storage region for storing a plurality of video data sequences;

a management information storage region which stores management information, the management information comprising group information that shows which video data sequences have been grouped together to compose a group from which only one of the composing video data sequences is reproduced, a level ID for each video data sequence in a same group and a set of link information for each video data sequence which indicates a next video data sequence to be reproduced after completion of reproduction of a video data sequence in question; and a level map storage region for storing a separate table for each country/region, wherein each table for a country/region includes information which maps each sort level in a sorting system for the country/region to a level ID for a movie title, wherein each movie title is made up of a series of video data sequences which are linked by sets of link information and wherein for each series of video data sequences, only a video data sequence whose level ID corresponds to the sort level is selectively reproduced out of video data sequences which have been grouped, the reproduction device comprising:

region code storage means for storing a region code showing a country/region;

level registration means for registering one of the sort levels for the sorting system used in the region indicated by the region code, in accordance with a user indication;

reading means for reading management information, mapping information and video data sequences from the optical disc;

table specification means for specifying a table for the country/region corresponding to the region code stored by the region code storage means;

title selection means for selecting a movie title in accordance with a user operation;

reproduction level setting means for setting a level ID which is for a selected movie title and which corresponds to the sort level registered in the level registration means as a reproduction level by referring to the specified table of the country/region;

reading control means for controlling the reading means to read a video data sequence belonging to the selected movie title which also corresponds to the set reproduction level; and reproduction means for reproducing every video data sequence read by the reading means.

32. The reproduction device of claim 31, wherein, when a next video data sequence to be reproduced is part of a group, a present set of link information indicates any video data sequence in the same group, and wherein the reading control means includes:

provisional setting means for provisionally setting a video data sequence indicated by the link information of a video data sequence presently being reproduced as a next video data sequence to be reproduced;

actual setting means for referring to the group information, for determining whether there is any other video data sequence which is grouped with the provisionally set video data sequence to allow selective reproduction, for actually setting the provisionally set video data sequence if no other video data sequence has been determined and for actually setting a video data sequence of the same group which corresponds to the reproduction level set by the reproduction level setting means if another video data sequence has been determined; and indication instruction means for indicating to the reading control means to have the actually set video data sequence reproduced.

33. The reproduction device of claim 31, wherein the actual setting means includes:

a comparison unit for comparing the reproduction level set by the reproduction level setting means with a level ID of each video data sequence which belongs to a same group as the provisionally set video data sequence;

a first determining unit for actually setting, when the comparison means finds that there is a video data sequence with a level ID which corresponds to the reproduction level, the video data sequence with the corresponding level ID; and a second determining unit for actually setting, when the comparison means finds that there is no video data sequence with a level ID which corresponds to the reproduction level, a video data sequence with a level ID which is close to the reproduction level but which represents a less restricted video content.

34. The reproduction device of claim 31, further comprising:

indication means for indicating a set of audio data according to a user operation;

video reproduction means for reproducing a video segment in a video data sequence;

audio selection means for selecting the indicated set of audio data from the plurality of sets of audio data which are to be reproduced with the video segment; and audio reproduction means for reproducing the selected set of audio data.

35. The reproduction device of claim 34, wherein a plurality of sets of sub-picture data which are to be reproduced together with video are interleaved in each video data sequence, wherein the indication means also indicates a set of sub-picture data and wherein the reproduction device further includes:

sub-picture selection means for selecting one set of sub-picture data which corresponds to an indicated language out of a plurality of sets of sub-picture data to be reproduced with a video segment; and sub-picture reproduction means for reproducing the selected set of sub-picture data.

36. The reproduction device for a multimedia optical disc which comprises: a video data storage region for storing one video data sequence; a management information storage region which stores management information, the management information comprising a level ID for the video data sequence; and a level map storage region for storing a separate table for each country/region, wherein each table for a country/region includes information which maps each sort level in a sorting system for the country/region to the level ID, the reproduction device comprising:

region code storage means for storing a region code showing a country/region;

level registration means for registering one of the sort levels for the sorting system used in the region indicated by the region code, in accordance with a user indication;

reading means for reading the management information, mapping information and the video data sequence from the optical disc;

table specification means for specifying a table for the country/region corresponding to the region code stored by the region code storage means;

reproduction level setting means for setting a level ID which corresponds to the sort level registered in the level registration means as a reproduction level by referring to the specified table of the country/region;

reading control means for determining a video data sequence corresponding to the set reproduction level and controlling the reading means to read the determined video data sequence; and reproduction means for reproducing every video data sequence read by the reading means.

37. A reproduction method for a multimedia optical disc which comprises: a video data storage region for storing a plurality of video data sequences; a management information storage region which stores management information, the management information comprising group information that shows which video data sequences have been grouped together to compose a group from which only one of the composing video data sequences is reproduced, a level ID for each video data sequence in a same group and a set of link information for each video data sequence which indicates a next video data sequence to be reproduced after completion of reproduction of a video data sequence in question; and a level map storage region for storing a separate table for each country/region, wherein each table for a country/region includes information which maps each sort level in a sorting system for the country/region to a level ID, the method comprising:

a first registration step for registering in memory a region code showing a country/region;

a second registration step for registering in memory one of the sort levels for the sorting system used in the region indicated by the region code, in accordance with a user indication;

a first reading step for reading management information and mapping information from the optical disc;

a table specification step for specifying a table in the mapping information for the country/region corresponding to the region code registered in the memory;

a reproduction level setting step for referring to the specified table of the country/region and setting a level ID which corresponds to the sort level registered in the memory as a reproduction level;

a second reading step for determining a video data sequence corresponding to the set reproduction level in accordance with the group information and reading the determined video data sequence.

* * * * *